United States Patent
Venugopal et al.

(10) Patent No.: US 11,722,193 B2
(45) Date of Patent: Aug. 8, 2023

(54) GROUP-BASED BEAM REPORTING USING PHASE CONTINUITY

(71) Applicant: QUALCOMM Incorporated, San Diego, CA (US)

(72) Inventors: Kiran Venugopal, Raritan, NJ (US); Yan Zhou, San Diego, CA (US); Wooseok Nam, San Diego, CA (US); Arumugam Chendamarai Kannan, San Diego, CA (US); Juergen Cezanne, Ocean Township, NJ (US); Junyi Li, Chester, NJ (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 47 days.

(21) Appl. No.: 17/125,865

(22) Filed: Dec. 17, 2020

(65) Prior Publication Data
US 2021/0194558 A1 Jun. 24, 2021

Related U.S. Application Data

(60) Provisional application No. 62/951,954, filed on Dec. 20, 2019.

(51) Int. Cl.
*H04B 7/06* (2006.01)
*H04L 5/00* (2006.01)
*H04W 24/10* (2009.01)

(52) U.S. Cl.
CPC ......... *H04B 7/0626* (2013.01); *H04B 7/0617* (2013.01); *H04B 7/0695* (2013.01);
(Continued)

(58) Field of Classification Search
CPC ... H04L 5/0005; H04L 5/0014; H04L 5/0048; H04B 7/0617–0632; H04B 7/0695
See application file for complete search history.

(56) References Cited

U.S. PATENT DOCUMENTS

2016/0381569 A1* 12/2016 Wang .................... H04W 16/28
                                                            370/338
2019/0045397 A1*  2/2019 Mueck .............. H04W 72/0493
(Continued)

FOREIGN PATENT DOCUMENTS

WO        2018071094 A1     4/2018

OTHER PUBLICATIONS

Ericcson: "Indication of URLLC Configuration", 3GPP Draft, 3GPP TSG-RAN WG1 Meeting #93, R1-1806017, Indication of URLLC Configuration, 3rd Generation Partnership Project (3GPP), Mobile Competence Centre, 650, Route Des Lucioles, F-06921 Sophia-Antipolis Cedex, France, vol. RAN WG1, No. Busan, Korea, Mat 21, 2018-May 25, 2018, May 20, 2018 (May 20, 2018), XP051441235, 5 Pages, Retrieved from the Internet: URL: http://www.3gpp.org/ftp/Meetings%5F3GPP%5FSYNC/RAN1/Docs/. [retrieved on May 20, 2018] p. 2.
(Continued)

*Primary Examiner* — Habte Mered
*Assistant Examiner* — Prince A Mensah
(74) *Attorney, Agent, or Firm* — Arent Fox LLP

(57) ABSTRACT

A UE may determine that two or more resources on two or more beams from a base station have phase continuity. The UE may determine, based on the two or more resources on the two or more beams having the phase continuity, a joint channel information associated with the two or more beams using individual measurements respectively corresponding to the two or more beams. The UE may then transmit, to the base station, a group-based beam report including the joint
(Continued)

channel information. The base station may provide the UE with an indication that the two or more resources on the two or more beams from the base station have phase continuity. The base station may receive the group-based beam report from the UE based on the indication, and the base station may configure communication with the UE on a joint channel based on the group-based beam report.

30 Claims, 9 Drawing Sheets

(52) U.S. Cl.
CPC ........... *H04L 5/0048* (2013.01); *H04W 24/10* (2013.01); *H04L 5/0005* (2013.01)

(56) References Cited

U.S. PATENT DOCUMENTS

2019/0349798 A1* 11/2019 Lin ..................... H04L 5/0048
2020/0336194 A1* 10/2020 Karjalainen .......... H04L 5/0094
2021/0314801 A1* 10/2021 Zhang ................. H04B 7/0408

OTHER PUBLICATIONS

Partial International Search Report—PCT/US2020/066195—ISA/EPO dated Mar. 22, 2021.
International Search Report & Written Opinion dated May 14, 2021 from corresponding PCT Application No. PCT/US2020/066195.

* cited by examiner

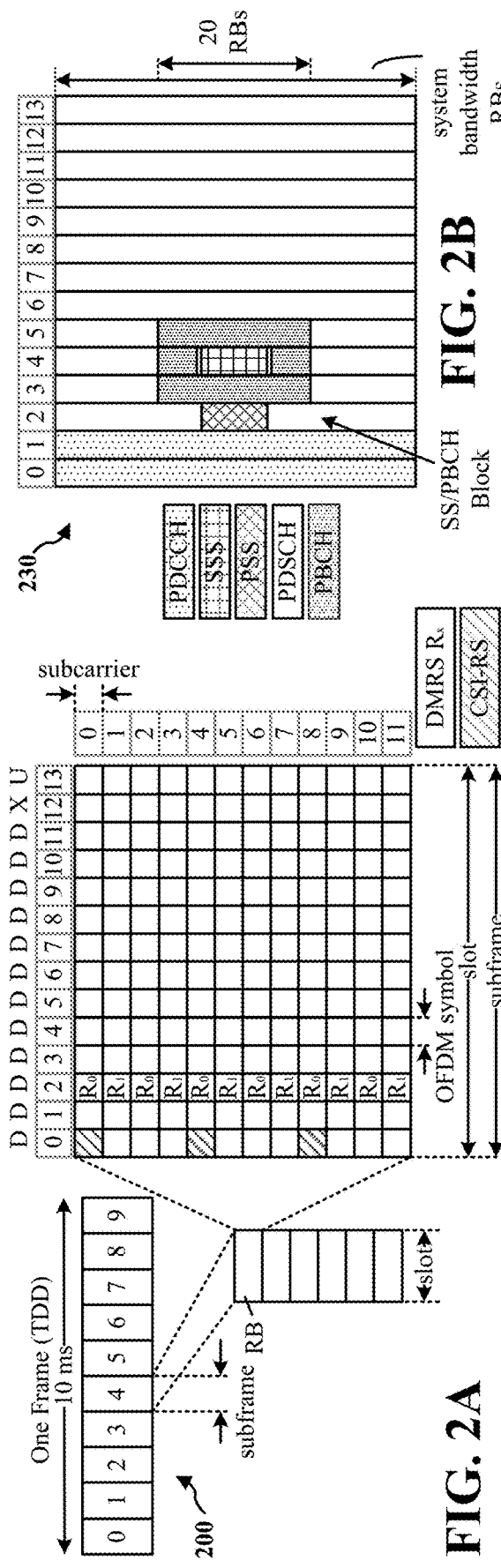
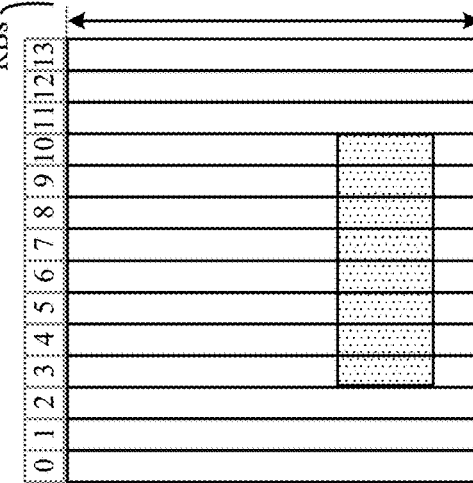
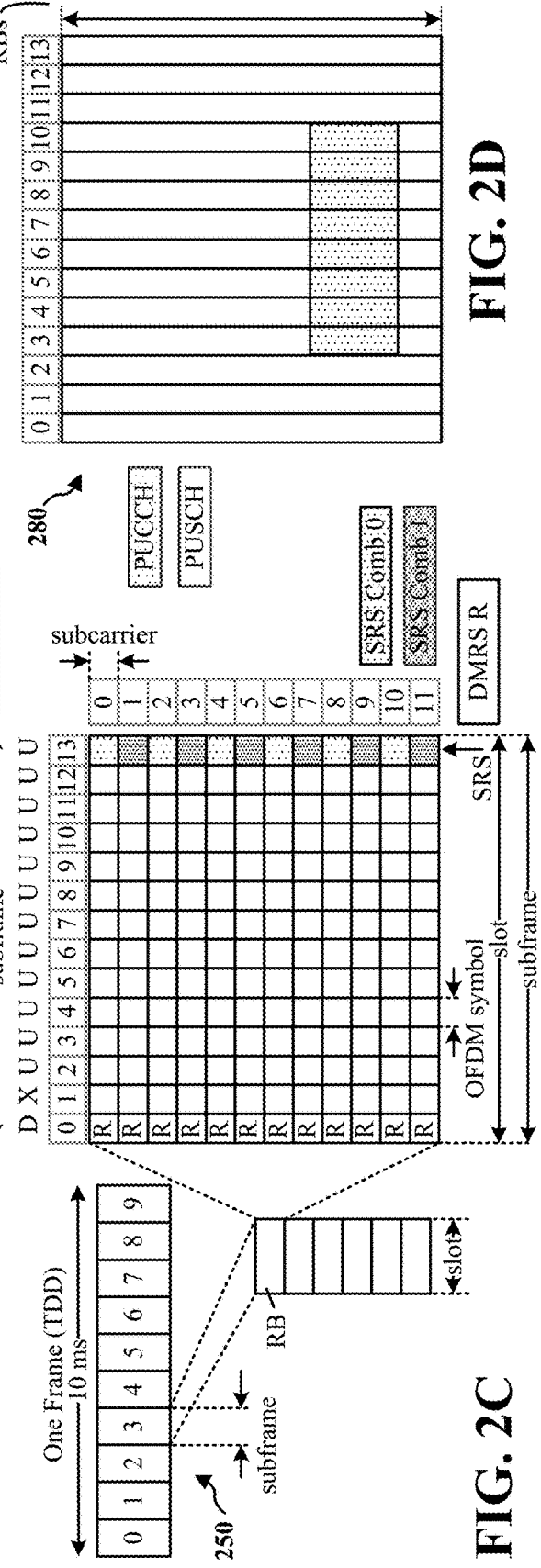
FIG. 2A
FIG. 2B
FIG. 2C
FIG. 2D

GROUP-BASED BEAM REPORTING USING PHASE CONTINUITY

CROSS REFERENCE TO RELATED APPLICATION(S)

This application claims the benefit of U.S. Provisional Application Ser. No. 62/951,954, entitled "group-based beam reporting using phase continuity" and filed on Dec. 20, 2019, the disclosure of which is expressly incorporated by reference herein in its entirety.

BACKGROUND

Technical Field

The present disclosure relates generally to communication systems, and more particularly, to at least one user equipment (UE) configured to report information associated with beamformed communication to a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time-division multiple access (TDMA) systems, frequency-division multiple access (FDMA) systems, orthogonal frequency-division multiple access (OFDMA) systems, single-carrier frequency-division multiple access (SC-FDMA) systems, and time-division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In order to improve link performance and to increase throughput, wireless communication between a base station and a user equipment (UE) may use multi-beam simultaneous transmission and reception. The use of multiple beams may provide macro-diversity as well as higher rates using multiple-input and multiple-output (MIMO) techniques. Beam grouping and group-based beam reporting may support simultaneous reception at a UE, e.g., using the same spatial filters or different spatial filters at the receiver (e.g., of the UE).

Limitations on beam and time/frequency resources may affect the UE's ability to perform simultaneous beam management measurements for multiple beams, e.g., in order to determine joint quasi-co-location (QCL) properties for simultaneous transmission/reception. Aspects presented herein enable a UE to determine joint beam characteristics using individual measurements for the beams.

In a first aspect of the disclosure, a first method, a first computer-readable medium, and a first apparatus for wireless communication are provided. The first apparatus, for example, may be implemented by a UE. The first apparatus may be configured to determine that two or more resources on two or more beams from a base station have phase continuity. The first apparatus may be further configured to determine, based on the two or more resources on the two or more beams having the phase continuity, joint channel information associated with the two or more beams using individual measurements respectively corresponding to the two or more beams. The first apparatus may then transmit, to the base station, a group-based beam report including the joint channel information associated with the two or more beams.

In a second aspect of the disclosure, a second method, a second computer-readable medium, and a second apparatus for wireless communication are provided. The second apparatus, for example, may be implemented by a base station. The second apparatus may be configured to transmit, to a UE, an indication that two or more resources on two or more beams from the second apparatus have phase continuity. The second apparatus may be further configured to receive, from the UE based on the indication, a group-based beam report including joint channel information associated with the two or more beams.

To the accomplishment of the foregoing and related ends, the one or more aspects comprise the features hereinafter fully described and particularly pointed out in the claims. The following description and the annexed drawings illustrate features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
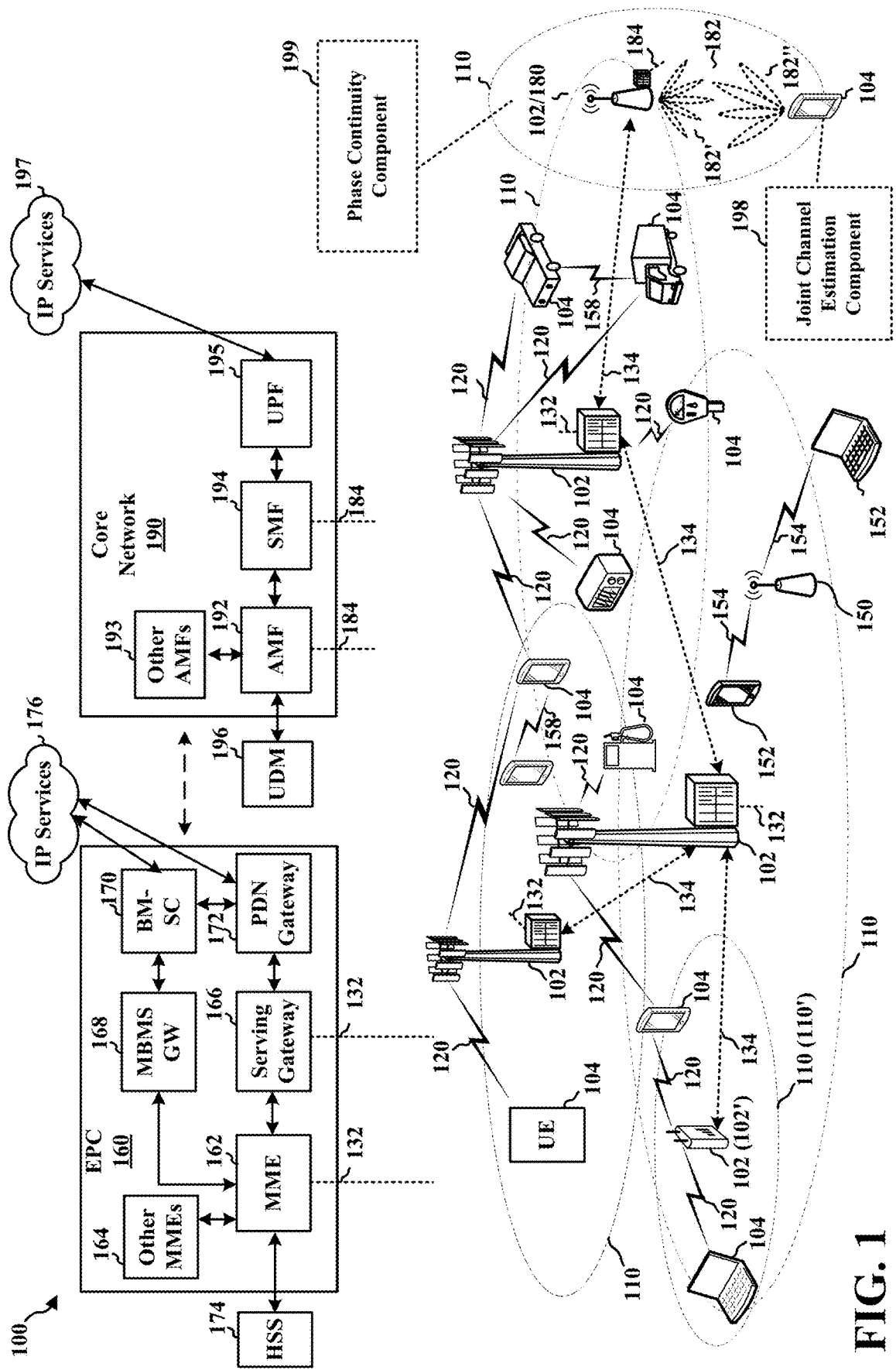
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In order to improve link performance and to increase throughput, wireless communication between a base station and a UE may use multi-beam simultaneous transmission and reception. The use of multiple beams may provide macro-diversity as well as higher rates using MIMO techniques. Beam grouping and group-based beam reporting may support simultaneous reception at a UE, e.g., using the same spatial filters or different spatial filters at the receiver.

Limitations on beam and time/frequency resources may affect the ability of the UE to perform simultaneous beam management measurements for multiple beams, e.g., in order to determine joint quasi-co-location (QCL) properties for simultaneous transmission/reception. Aspects presented herein enable a UE to determine joint channel and/or joint beam information (e.g., properties and/or characteristics) using individual measurements respectively corresponding to the beams. In some aspects, a UE may determine that resources (e.g., reference signal resources) on two or more beams from a base station have phase continuity. A base station may provide the UE with an implicit indication or an explicit indication that two or more resources on two or more beams from the base station have phase continuity. The UE may determine, based on the two or more resources on the two or more beams having the phase continuity, joint channel and/or joint beam information for the two or more beams using respective individual measurements for each of the two or more beams. The UE may then transmit, to the base station, a group-based beam report including the joint channel and/or joint beam information (e.g., properties and/or characteristics) for the two or more beams.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations 180, such as a gNB may operate in a traditional sub 6 GHz spectrum, in millimeter wave (mmW) frequencies, and/or near mmW frequencies in communication with the UE 104. When the gNB, e.g., base station 180, operates in mmW or near mmW frequencies, the gNB may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., base station 180, may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the base station 102/180 may include a phase continuity component 199 configured to transmit an indication that implicitly or explicitly indicates to the UE 104 that two or more resources respectively on two or more beams from the base station 102/180 have phase continuity. For example, each of the two or more resources may be a resource of a reference signal (e.g., including a synchronization signal) communicated via a respective beam of the two or more beams from the base station 102/180. Accordingly, the UE 104 may receive the implicit or explicit indication that two or more resources on two or more beams from the base station 102/180 have phase continuity.

The UE 104 may include a joint channel estimation component 198 configured to determine that two or more resources respectively on two or more beams from a base station 102/180 have phase continuity. The joint channel estimation component 198 may be further configured to determine, based on the two or more resources on the two or more beams having the phase continuity, joint channel and/or joint beam information (e.g., joint channel/beam characteristic(s) and/or properties) for the two or more beams using individual measurements respectively corresponding to the two or more beams. The UE 104, and in particular the joint channel estimation component 198, may use the indication from the base station 102/180 to determine the phase continuity of resources on the two or more beams and/or to determine the joint channel/beam information.

The UE 104 may be further configured to transmit, to the base station 102/180, a group-based beam report including the joint channel/beam information for the two or more beams, e.g., based on a respective individual measurement corresponding to each of the two or more beams. Correspondingly, the base station 102/180 may receive the group-based beam report including the joint channel/beam information for the two or more beams, and the base station 102/180 may configure (multi-beam) communication with the UE 104 based on the joint channel/beam information for the two or more beams included in the group-based beam report.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency-division duplexed (FDD) in which for a particular set of subcarriers (carrier system bandwidth), subframes within the set of subcarriers are dedicated for either DL or UL, or may be time-division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC- FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one reference signal (RS) and/or pilot signal for the UE. The at least one RS may include at least one demodulation RS (DM-RS) (e.g., indicated as R$_X$ for one particular configuration, where 100× is the port number, but other DM-RS configurations are possible) and/or at least one channel state information (CSI) RS (CSI-RS) for channel estimation at the UE. The at least one RS may additionally or alternatively include one or more beam measurement RS (BRS), beam refinement RS (BRRS), and/or phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (ID) (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as a "synchronization signal block" and/or an "SSB"). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), a layer indicator (LI), and/or hybrid automatic repeat request (HARQ) ACK/NACK feedback. The PUSCH carries data, and may additionally be used to carry a buffer status report (BSR), a power headroom report (PHR), and/or UCI. In some configurations, some ACK/NACK feedback may be carried on the PUSCH, in addition or alternative to the PUCCH.

Figure 3:
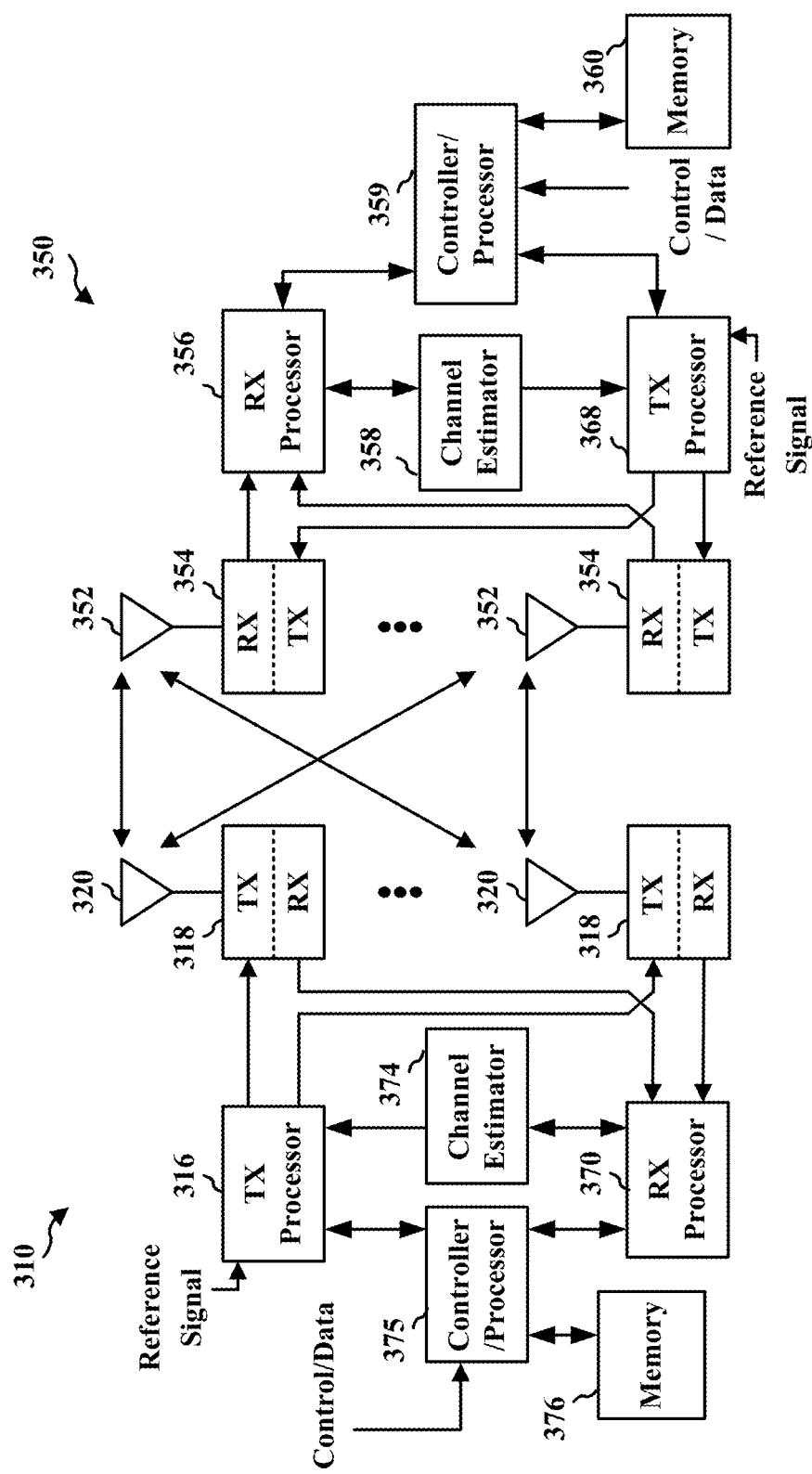
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 (L3) and/or layer 2 (L2) functionality. L3 may include a radio resource control (RRC) layer, and L2 may include a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and/or L2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with 198 of FIG. 1.

In some other aspects, at least one of the TX processor 316, the RX processor 370, and the controller/processor 375 may be configured to perform aspects in connection with 199 of FIG. 1.F As generally described herein, some communication in an example access network may occur in a mmW/near-mmW access network, and therefore, may be beamformed. By way of illustration, FIG. 1 shows a UE 104 and a base station 102/180 that utilize beamforming 182 to communicate using beams, e.g., so that the base station 102/180 may transmit signaling in one or more transmit directions 182' and the UE 104 may correspondingly receive such signaling in one or more receive directions 182".

A base station and UE may perform beam management in order to select and adjust beams for communication between the base station and the UE. In downlink beam management, the base station may provide opportunities for the UE to measure beamformed channels having different combinations of TX beams of the base station and RX beams of the UE by transmitting a respective RS using one or more of the TX beams. The UE may report, to the base station, one or more measurements respectively corresponding to one or more of the TX beams (e.g., combined with one or more RX beams to form one or more beam pair links). In response to such reporting, the base station may provide a beam management configuration to UE. For example, a beam management configuration may include at least one of resource configuration(s) associated with CSI-RS(s) and/or SSB(s), beam report setting, and/or other information associated with configuring beamformed communication between the base station and the UE.

According to various aspects, the base station may perform periodic beam sweeping with the UE by transmitting a respective RS using individual TX beams of the base station, which may be received by RX beams of the UE. The UE may measure information about a beamformed channel state using different RX beams of the UE, and based thereon, may report measurement information to the base station. For example, the UE may report measurement information associated with at least one TX beam (e.g., which may be paired with at least one RX beam), such as a reference signal received power (RSRP), reference signal received quality (RSRQ), signal-to-noise ratio (SNR), signal-to-interference-plus-noise ratio (SINR), CSI, and/or other measurement information, which may be indicative of a beam quality.

In some aspects, the measurement information reported by the UE may be included in a CSI report, such as a periodic, aperiodic, and/or semi-persistent CSI report. The UE may use CSI-RS(s) and/or SSB(s) to perform measurements for different beams, and thus, to provide a CSI report. For example, an SSB may be used for initial access and may not involve additional overhead for use in beam management (e.g., including CSI reporting). SSBs may have limited bandwidth, whereas CSI-RSs may be configured with different frequency ranges. However, the transmission of CSI-RS(s) for beam management may use additional overhead, but may enable flexibility in the allocation of resources for RSs.

Beam management may be performed on a per-beam basis, with the UE measuring and reporting for individual beams. In addition or alternative to measurement and reporting for individual beams, the UE may be configured for group-based beam reporting, e.g., in which beam management may be performed and reported for a group of beams rather than for individual beams. For example, group-based beam management may be performed such that beam tracking and/or beam refinement within a group of beams or multiple groups of beams can be supported.

Group-based beam reporting may reduce some overhead, e.g., in terms of signaling, feedback, etc., for beam management associated with TX/RX (e.g., simultaneous TX/RX or non-simultaneous TX/RX). For example, group-based beam reporting may reduce signaling associated with reporting measurement information relative to signaling associated with non-group-based beam reporting, such as CSI and/or other measurement reporting for individual beams.

In some aspects, a group-based beam report may include measurement information associated with a representative beam via which the UE receives some signaling that is measured by the UE—that is, measurement(s) by the UE of one or more RSs received by the UE via the representative beam may be used to indicate the quality of the representative beam. The representative beam may be one of the beams in the group of beams or may represent an average of the measurements for the beams in the group. For example, the representative beam may be a beam via which an RS having a maximum (e.g., highest, best, etc.) measurement value is received, e.g., relative to other measurement values for other RSs received via other beams.

In addition to measurement information associated with the representative beam, a group-based beam report may include some measurement information associated with one or more other beams, such as one or more beams associated with one or more of the next consecutive measurement value(s) (e.g., the next highest measurement values(s), the next best measurement value(s), etc.). Illustratively, a group-based beam report may include measurement information associated with the representative beam, which may be the beam via which an RS having the "best" measurement value is received, as well as measurement information associated with one or more other beams of a group of beams. The one or more other beams of the group of beams may be the beam(s) via which respective RS(s) having the next best measurement value(s) is received. In the group-based beam report, however, the measurement information associated with the one or more other beams of the group of beams may be indicated relative to the measurement information associated with the representative beam.

For example, a group-based beam report may include a measurement value of an RSRP measured for an RS received via the representative beam—e.g., the group-based beam report may include information indicating the highest decibel-milliwatts (dBm) measured for an RS received on the representative beam. Further, the group-based beam report may include measurement information associated with one or more other beams having the next highest dBm value(s). However, the measurement information associated with the one or more other beams may be indicated as a respective differential value (e.g., relative to the highest dBm value of the representative beam) measured for another RS(s) received via another beam(s) in the group of beams. Potentially, a differential value may be represented as a certain number of intervals or fixed amounts lower than the measurement value associated with the representative beam—e.g., a group-based beam report may indicate a measurement value associated with another beam of the beam group as x number of 2 dBm intervals less than the highest dBm value associated with the representative beam.

In some aspects, group-based beam reporting may be based on a report quantity set, a CRI-RSRP, and/or an SSB-index-RSRP. In some other aspects, group-based beam reporting may be based on a metric at L1, such as a metric for L1-SINR and/or L1-RSRP. For example, the UE may report a largest L1-RSRP (e.g., 7 bits) from measured RSs and/or a differential L1-RSRP (e.g., 4 bits) relative to the largest measured RSRP (e.g., as a differential value may be indicated using fewer bits than a true or actual measurement value). Further, where a beam-based report may include measurement information for individual beams, a group-based beam report may have less information about individual beams than the beam-based report. In some aspects, a group-based beam reporting might not include CSI quantities per CSI-RS resource indicator (CRI)/SSB resource block indicator (SSBRI), e.g., which may be present in some beam-based reporting.

A base station may configure a UE for L1-SINR-based beam report for non-group-based and/or group-based beam reporting. When the base station configures the UE to report an SSBRI and/or a CRI and a corresponding L1-SINR, a report format may include a range and/or a step size (e.g., interval) associated with differential SINR. For example, a differential SINR for a group of M beams, may be determined based on the difference between the measured SINR corresponding to the CRI/SSBRI for the M beams and the measured SINR corresponding to CRI/SSBRI for a beam having the largest SINR among the reported SINRs.

In order to improve link performance and to increase throughput, wireless communication between a base station and a UE may use multi-beam simultaneous TX/RX. The use of multiple beams may provide macro-diversity, as well as higher rates (e.g., relative to TX/RX using a single beam pair), using MIMO techniques. Beam grouping and group-based beam reporting may support simultaneous reception at a UE, e.g., using the same or different spatial filters at the receiver (e.g., at the UE), which may be simultaneous. Additionally or alternatively, a UE may use multi-beam TX/RX that is non-simultaneous. For example, a UE may employ time-division multiplexing (TDM) for non-simultaneous TX/RX using multiple beams.

When a UE is configured to enable group-based beam reporting, the UE can report multiple different CRI/SSBRI per report setting, such as two different CRI/SSBRI per report setting. The CSI-RS and/or SSB resources, e.g., for CRI and/or SSBRI, respectively, may be simultaneously received by the UE either with a single beam or with multiple (simultaneous) beams. Measurement of the RSs by the UE, and grouping of beams, may be used for simultaneous TX/RX, e.g., with joint QCL on a data channel. In some aspects, capabilities of the UE for simultaneous reception using a single beam or multiple (simultaneous) beams for CSI-RS and/or SSB resources may be assumed. While some SSB resources may be time-division multiplexed, transmission configuration indicator (TCI) states that are quasi-colocated with SSB resources may be simultaneously received.

A base station may have a limit on the maximum number of CSI resource sets that can be configured for joint measurement. Thus, the amount of resources that can be configured by the network for the UE to perform simultaneous beam management measurements may be limited. Limitations on beam and time/frequency resources may affect the ability of a UE to perform simultaneous beam management measurements for multiple beams, e.g., in order to determine joint QCL properties for simultaneous TX/RX. Therefore, a group-based beam report may not include information about all possible joint QCL combinations.

Figure 4:
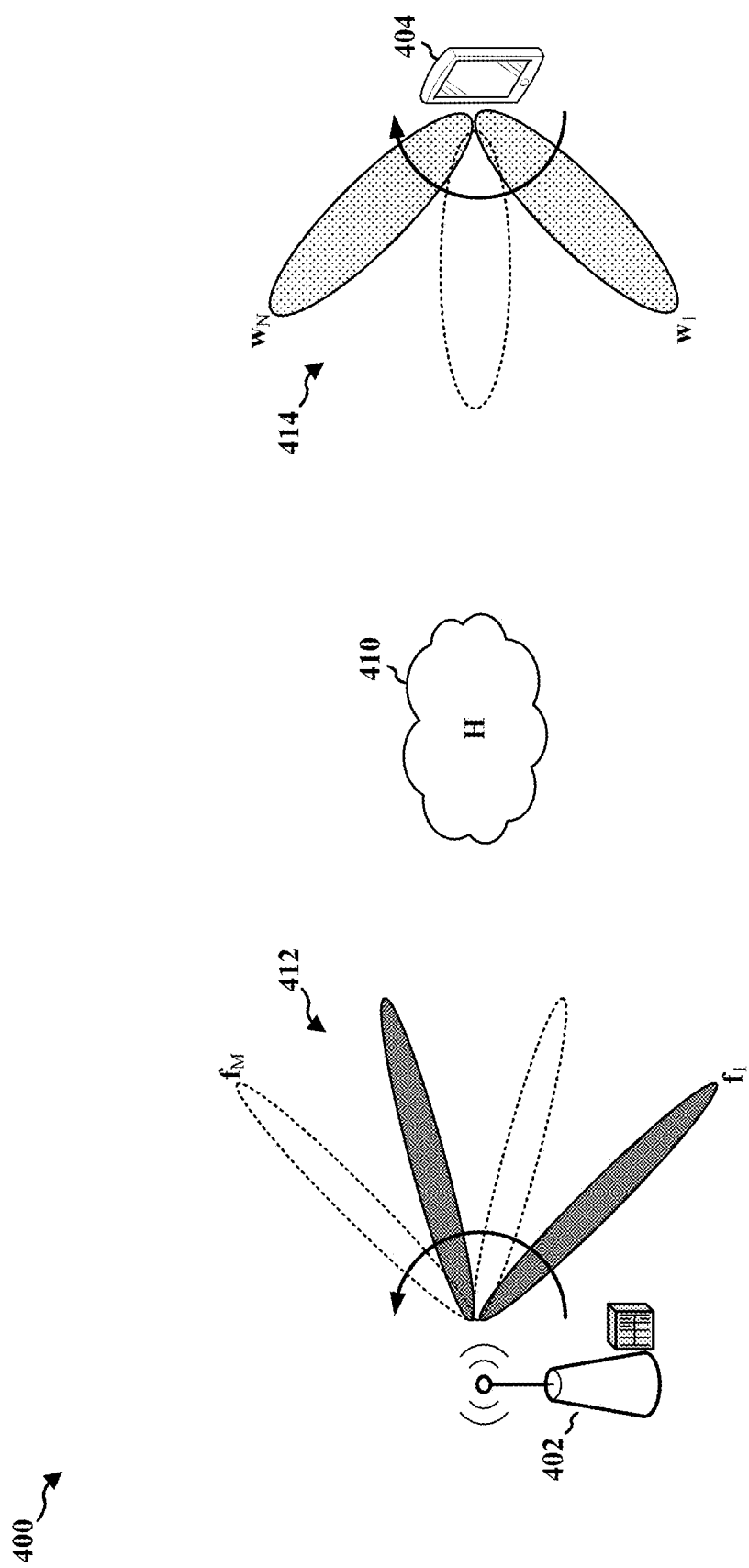
FIG. 4 is a diagram illustrating an example communication system including a base station and a UE using beamformed communication.

FIG. 4 is a diagram illustrating an example communication system 400 including a base station 402 and a UE 404 configured to communicate on at least one channel H 410 (e.g., the at least one channel H 410 may be the raw channel), in accordance with various aspects of the present disclosure. The base station 402 and the UE 404 may be configured for mmW/near-mmW communication the on at least one channel H 410 using directional beams, with the base station 402 having M beams 412 and the UE 404 having N beams 414. For example, with mmW/near-mmW communication, the base station 402 may configure a MIMO scheme with the UE 404. In order to configure MIMO schemes, one or more beam pair links may be configured for communication between the base station 402 and the UE 404. A beam pair may include one of TX beams 412 for the base station 402 and one of RX beams 414 for the UE 404.

In some aspects, the conditions of the channel H 410 (e.g., the environment affecting the channel H 410, such as blockages, reflectors, etc.) and/or the characteristics/capabilities of the base station 402 and/or the UE 404 (e.g., a respective number of antenna elements, the number of antenna ports with which the UE 404 can measure the channel H 410, etc.) may influence beam training/channel measurements on the channel H 410. As such, the channel H 410 may be represented as an effective channel $H_{eff}$. The effective channel $H_{eff}$ may be a function of the receiver (e.g., an analog combiner of the UE 404) $W_{RF}=[w_1, w_2, \ldots, w_N]$ and the transmitter (e.g., an analog precoder of the base station 402) $F_{RF}=[f_1, f_2, \ldots, f_M]$, where each of $W_{RF}$ and $F_{RF}$ may be a respective matrix including beam weights $w_1$, $w_2, \ldots, w_N$ and $f_1, f_2, \ldots, f_M$, respectively.

In some aspects, the base station 402 and/or the UE 404 (e.g., at respective lower layers, such as respective PHY layers and/or baseband-related layers) may observe the effective channel $H_{eff}$ according to Equation 1 (where $W_{RF}^*$ is the conjugate).

$$H_e = W_{RF}^* H F_{RF} \quad \text{(Equation 1)}$$

In some aspects, the base station 402 and the UE 404 may be configured with two or more beam pairs, e.g., for spatial diversity on the at least one channel H 410. For example, the effective (joint) channel $H_{eff}$ based on the joint QCL properties for simultaneous reception/transmission for two beam pairs may be given according to Equation 2:

$$H_{eff} = [q_k, w_l]^* H [f_i, f_j] \quad \text{(Equation 2)}$$

Configuration of multiple beam pairs may rely on beam training/channel measurements, e.g., to account for the conditions of the at least one channel H 410 on which the base station 402 and the UE 404 communicate. Beam training/channel measurements on the order $O(M^2N^2)$ may be commensurate with estimating the effective (joint) channel $H_{eff}$, e.g., as shown in Equation 2, for two beam pairs. The beam training/channel measurements may correspond to joint QCL properties for simultaneous reception/transmission for each of the possible sets of two (or more) beam pairs between the base station 402 and the UE 404.

However, the order $O(M^2N^2)$ of such beam training/channel measurements may incur significant overhead, e.g., in terms of over-the-air signaling, processing consumption, etc. This overhead may appreciably affect communication on the at least one channel H 410, such as by increasing the latency experienced by the UE 404 and/or reducing the data rate at which the base station 402 transmits to the UE 404. Additionally, configuration of multiple (e.g., two or more) beam pairs between the base station 402 and the UE 404 may be limited by the potential signaling configuration, such as the number of available RSs (e.g., CSI-RSs) that can be configured for group-based beam reporting.

The effective channel $H_{eff}$ may be represented based on pair-wise estimation of individual components, e.g., by the UE 404, as shown in Equation 3:

$$H_{eff} = \begin{bmatrix} w_k^* H f_i & w_k^* H f_j \\ w_l^* H f_i & w_l^* H f_j \end{bmatrix} \quad \text{(Equation 3)}$$

Each element of the matrix shown in Equation 3 may correspond to one beam pair. For example, $w_i^* H f_j$ may represent the effective channel $H_{eff}$ with the $l^{th}$ RX beam (e.g., of beams 414 of the UE 404) and the $j^{th}$ TX beam (e.g., of the beams 412 of the base station 402). Thus, Equation 3 may model the effective channel $H_{eff}$ with two beams i and j selected from the beams 412 of the base station 402 paired with the two beams k and l selected from the beams 414 of the UE 404. In particular, $w_k^*$ and $w_l^*$ respectively correspond to conjugate transposes of the $k^{th}$ and $l^{th}$ Rx beams of the UE 404.

As described herein, the order of beam training/channel measurements may be reduced from $O(M^2N^2)$ to $O(M\,N)$ through signaling configuration (e.g., configuration of CSI-RSs for group-based beam reporting), e.g., assuming the at least one channel H 410 to be quasi-static. Such order reduction (e.g., from $O(M^2N^2)$ to $O(M\,N)$) may reduce the overhead commensurate with beam training/channel measurements.

Determination by the UE 404 of the effective channel $H_{eff}$ may be useful because MIMO rates, diversity gains, and the like may be based on joint QCL properties of the effective channel $H_{eff}$. For example, at least one of rank, per-stream CQI, precoding, and/or other similar communication parameter(s) may be based on singular value decomposition (SVD) of $H_{eff}$. Furthermore, beam pairs providing satisfactory performance (e.g., communication quality, throughput, etc.) individually, such as ($w_k$, $f_i$) and/or ($w_l$, $f_j$), may fail to provide such satisfactory performance when jointly configured for simultaneous transmission/reception.

However, individual training/measurement of beams used for the joint channel (e.g., according to Equation 3) may cause errors in computation of the joint channel as a consequence of phase discontinuity between resources on beams, such as phase discontinuity between CSI-RS resources on TX beams 412 of the base station 402. Phase discontinuity may be caused by delays in beam switching, alternation of beam weights across symbols, and/or other phase noise.

Thus, the order O(M N) of beam training/channel measurements may be attainable when beams used for the joint channel are individually trained/measured if resources on TX beams of the two (or more) beam pairs have phase continuity. Accordingly, the UE 404 may be provided with information indicating at least two resources on at least two beams (e.g., as least two of the TX beams 412 of the base station 402) have phase continuity.

The signaling of a phase continuity indication from the base station 402 may enable the UE 404 to calculate mutual channel information for multiple beam pairs based on estimation of the effective channel $H_{\it eff}$, which may be determined based on individual measurements of the respective beams, such as described herein. Therefore, the overhead (e.g., processing load, over-the-air signaling, etc.) on the UE 404 and/or base station 402 may be reduced when resources (e.g., CSI-RS resources) on TX beams of two or more beams pairs have phase continuity, e.g., in association with group-based beam reporting for simultaneous transmission/reception and/or configuration of multiple beam pairs to improve throughput.

In particular, the base station 402 may indicate to the UE 404 whether resources of RSs on multiple beams have phase continuity. For example, the base station 402 may signal, to the UE 404, that two (or more) CSI-RS resources on two (or more) TX beams of the beams 412 have phase continuity. Accordingly, the UE 404 may perform pair-wise estimation of individual components for the joint channel with sufficient accuracy for group-based beam reporting for simultaneous transmission/reception.

Figure 5:
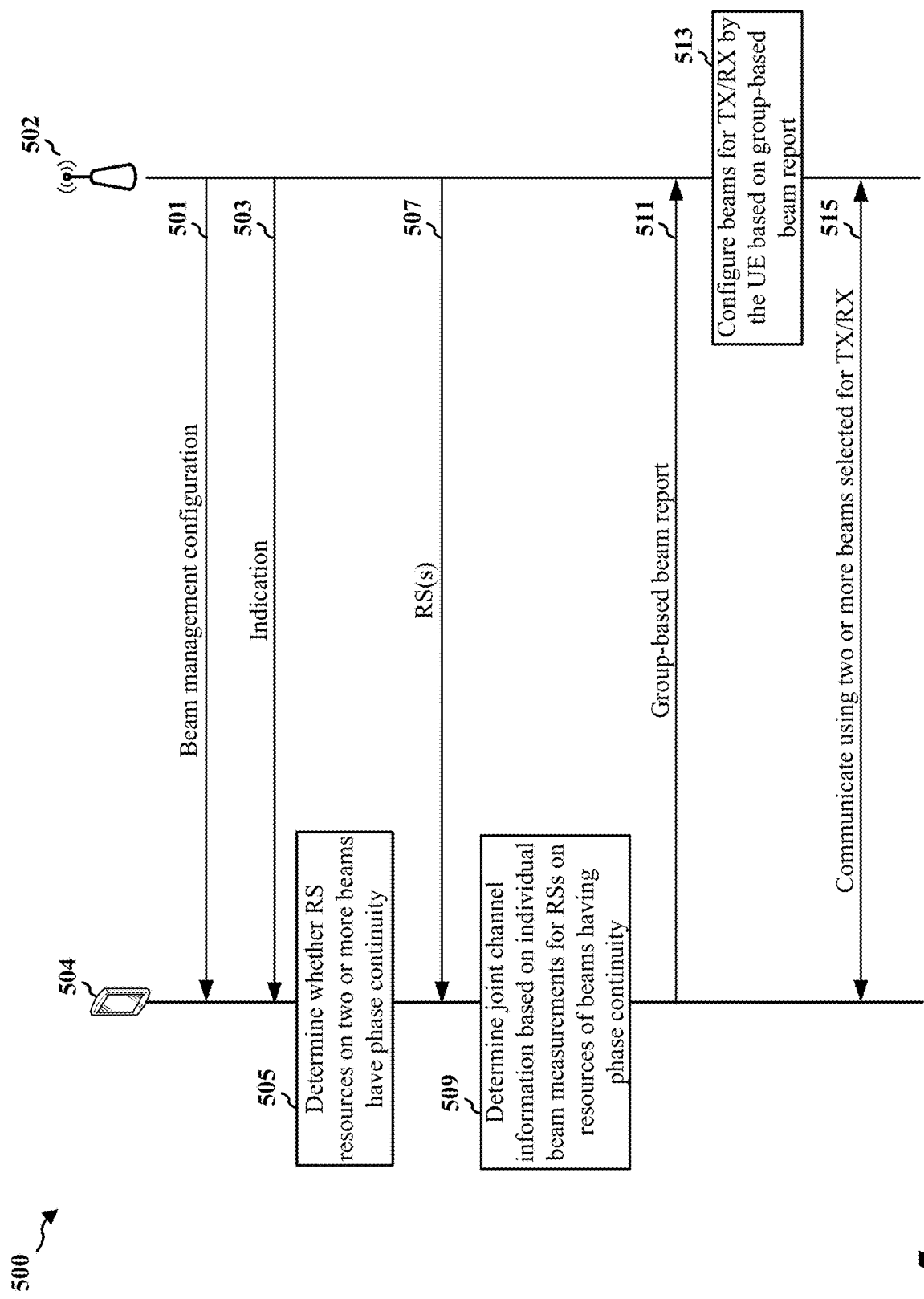
FIG. 5 is a call flow diagram illustrating an example communication flow between a base station and a UE.

FIG. 5 is a call flow diagram illustrating an example communication flow 500 between a base station 502 and a UE 504, in accordance with various aspects of the present disclosure. As shown in the example communication flow 500, the base station 502 may transmit a beam management configuration 501 to the UE 504. For example, the beam management configuration 501 may be (or may include) a CSI reporting configuration. The beam management configuration 501 may enable group-based beam reporting by the UE 504 to the base station 502. For example, the beam management configuration 501 may include information configuring the UE 504 to report up to two CRI/SSBRI per report setting.

The base station 502 may transmit the beam management configuration 501 to the UE 504 via RRC signaling, such as in an information element (IE) and/or field of an RRC message. For example, the beam management configuration 501 may include an RRC message having an IE for a CSI reporting configuration (e.g., CSI-ReportConfig IE), and the CSI reporting configuration IE may include information (e.g., a field) indicating that group-based beam reporting is enabled for CSI reporting by the UE 504 that is based on the CSI reporting configuration IE.

According to various aspects, the beam management configuration 501 may configure respective RSs on one or more resources of one or more beams from the base station 502. For example, the beam management configuration 501 may include information configuring the UE 504 to receive at least one CSI-RS carried on at least one resource respectively on each of a set of TX beams of the base station 502. Accordingly, each of the CSI-RSs (on a respective CSI-RS resource) may be associated with a respective TX beam of the set of TX beams of the base station 502.

Additionally or alternatively, the beam management configuration 501 may configure the UE 504 to report at least one (e.g., one or two) CRI/SSBRI and/or some information associated therewith, such as measurement information (e.g., SINR and/or RSRP) and/or other CSI information (e.g., CQI, PMI, RI, and/or LI) derived from CSI-RS(s)/SSB(s) received via beam(s) respectively corresponding to the at least one CRI/SSBRI. The at least one CRI/SSBRI and/or associated information (e.g., measurement values, CSI, etc.) may be used by the base station 502 to configure communication with the UE 504 for simultaneous TX/RX with joint QCL on a data channel. Additionally or alternatively, the base station 502 may use the at least one CRI/SSBRI and/or associated information to configure the UE 504 for multi-beam non-simultaneous TX/RX.

Further, the base station 502 may transmit, to the UE 504, an indication 503 associated with phase continuity of resources on multiple beams (e.g., two or more beams) of the base station 502. In particular, the base station 502 may transmit the indication 503 to the UE 504 to indicate to the UE 504 whether two or more resources on two or more beams are continuous with respect to phase. For example, the indication 503 may indicate to the UE 504 whether two or more CSI-RS resources respectively on two or more TX beams of the base station 502 have phase continuity. The base station 502 may transmit the indication 503 to the UE 504 via at least one of RRC signaling, DCI, and/or a MAC control element (CE).

In some aspects, the base station 502 may explicitly transmit the indication 503 to the UE 504. That is, the base station 502 may transmit some information (e.g., one or more values, etc.) explicitly defined or configured to convey whether two or more resources on two or more beams of the base station 502 have phase continuity. For example, the base station 502 may include the indication 503 in the beam management configuration 501 and/or in another message, which may or may not be dedicated to carrying the indication 503.

According to some examples of an indication 503 that may be considered explicit, the base station 502 may indicate two or more CSI-RS resources on two or more beams of the base station 502 have phase continuity when the two or more CSI resources are associated with a same CSI report configuration ID and/or are associated with a same CSI report configuration enabling group-based beam reporting. For example, the base station 502 may indicate that the UE 504 may assume that a first set of CSI-RS resources (e.g., CSI-RS resources 1, 4, 6, and 10) have phase continuity. In some aspects, the UE 504 may then determine that CSI-RS resources excluded from the first set (e.g., CSI-RS resources other than 1, 4, 6, and 10) do not have phase continuity. In some other aspects, the base station 502 may indicate, to the UE 504, that a second set of CSI-RS resources (e.g., CSI-RS resources different from CSI-RS resources 1, 4, 6, and 10) have phase continuity, but are discontinuous in terms of phase with respect to the first set of CSI-RSs (e.g., CSI-RS resources 1, 4, 6, and 10). Thus, the base station 502 may indicate phase continuity for each of multiple groups of CSI-RS resources, with CSI-RS resources having phase continuity within a respective group but not necessarily having phase continuity across different groups. Effectively, the base station 502 may indicate to the UE 504 which CSI-RS resources may be grouped together (e.g., CSI-RS resources assumed to have phase continuity) to derive joint channel properties based on individual measurements respectively associated with CSI-RS resources having phase continuity.

In some other aspects, the base station 502 may implicitly transmit, to the UE 504, the indication 503, which potentially may be based on at least one rule and/or defined relationship. For example, the base station 502 may transmit some information to the UE 504 that is not dedicated to indicating phase continuity of multiple resources on multiple beams, and the UE 504 may be configured to derive the indication 503 from such information.

Some illustrative configurations of an indication 503 that is implicit may include an indication of a multiplexing mode of communication and/or an indication of a use case associated with CSI (and/or beam) reporting (e.g., a group-based beam report or a non-group-based beam report). According to one example, the UE 504 may determine that all CSI-RS resources (e.g., on two or more beams of the base station 502) associated with the same CSI reporting configuration having group-based beam reporting enabled have phase continuity if the base station 502 indicates that the CSI reporting is associated with a spatial-division multiplexing (SDM) mode of communication and/or associated with enhanced mobile broadband (eMBB) communication. According to some other examples, the multiplexing mode may include frequency-division multiplexing (FDM), SDM, and/or TDM.

According to some further examples, the use case associated with CSI and/or beam reporting (e.g., group-based beam reporting) may include ultra-reliable low latency communication (URLLC) (e.g., in addition or alternative to eMBB), and such URLLC-related use case (and/or eMBB-related use case) may implicitly indicate whether resources on two or more beams of the base station 502 have phase continuity. According to still other example, a CSI reporting configuration enabling the group-based beam report (e.g., the beam management configuration 501), such as a CSI reporting configuration that enables the group-based beam reporting for SDM-mode communication and/or eMBB communication, may implicitly indicate whether resources on two or more beams of the base station 502 have phase continuity.

At operation 505, the UE 504 may determine whether two or more RS resources respectively on two or more beams of the base station 502 have phase continuity. The operation 505 by the UE 504 may be based on the explicit or implicit indication 503 received from the base station 502. For example, phase continuity between multiple RS resources on multiple beams from the base station 502 may be configured (e.g., enabled, implemented, etc.) and/or maintained (e.g., enforced, applied, etc.) by the base station 502, and therefore, the operation 505 by the UE 504 of whether multiple RS resources on multiple beams from the base station 502 may be derived by the UE 504 according to information received from the base station 502, such as the (explicit or implicit) indication 503.

The operation 505 by the UE 504 may be further based on the beam management configuration 501, which may configure the RS resources on two or more beams from the base station 502. For example, the beam management configuration 501 may configure two or more CSI-RS resources carrying respective CSI-RSs on two or more TX beams of the base station 502. Thus, at operation 505, the UE 504 may determine whether the two or more CSI-RS resources respectively on the two or more TX beams have phase continuity (e.g., based on the explicit or implicit indication 503).

Illustratively, the base station 502 may configure (e.g., enable, enforce, apply, etc.) phase continuity for all RS resources (e.g., all CSI-RS resources) associated with the same CSI reporting configuration (e.g., of beam management configuration 501) that indicates group-based beam reporting enabled when the CSI reporting configuration is associated with at least one specific multiplexing mode (e.g., SDM) and at least one specific use case (e.g., eMBB). Therefore, the UE 504 may determine that all RS resources associated with the same CSI reporting configuration in which group-based beam reporting is enabled have phase continuity across respective beams of the base station 502 based on a rule defining the implicit indication 503 as the CSI reporting configuration being for the at least one specific multiplexing mode and the at least one specific use case. For example, at operation 505, the UE 504 may determine that all CSI-RS resources configured by the beam management configuration 501 (enabling group-based beam reporting) have phase continuity across respective beams of the base station 502 based on the beam management configuration 501 configuring CSI reporting by the UE 504 for SDM communication and eMBB use case. In other words, the beam management configuration 501 configuring CSI reporting by the UE 504 for SDM communication and eMBB use case may serve as (at least a portion of) the implicit indication 503 that CSI-RS resources configured by the beam management configuration 501 have phase continuity across the respective TX beams of the base station 502.

The base station 502 may transmit, to the UE 504, a respective set of RSs 507 (e.g., one or more RSs) on each of two or more TX beams of the base station 502. Correspondingly, the UE 504 may receive, using a set of RX beams of the UE 504, a respective set of RSs 507 on each of the two or more TX beams from the base station 502. In some aspects, the UE 504 may receive the respective sets of RSs 507 on each of the two or more TX beams from the base station 502 based on the beam management configuration 501. For example, the beam management configuration 501 may configure a set of CSI-RS resources, and the UE 504 may receive each respective set of CSI-RSs carried on CSI-RS resources on each of the two or more TX beams from the base station 502 based on the beam management configuration 501 configuring the CSI-RS resources.

In some other aspects, each of the RSs 507 may be (or may include) an SSB. The UE 504 may receive a respective SSB carried on a respective resource on each of the two or more beams from the base station 502, with each SSB identifying the respective beam of the two or more beams on which that SSB is transmitted. For example, according to the operation 505, the UE 504 may receive a respective SSB on each of two or more resources determined to have phase continuity across the two or more beams on which the two or more resources are configured.

According to the operation 505, the UE 504 may determine that resources carrying RSs 507 on two or more beams from the base station 502 have phase continuity. Therefore, at operation 509, the UE 504 may determine joint channel information based on individual measurements for the RSs 507 carried on two or more resources on two or more beams from the base station 502 having phase continuity. Each of the individual measurements may correspond to a respective one of the two or more beams on which a respective one of the RSs 507 is received. As the resources on which the RSs 507 are received have phase continuity on the two or more beams from the base station 502, the individual measurements respectively corresponding to the two or more beams may be used to determine (e.g., estimate) the joint channel information.

In some aspects, the joint channel information may include information indicating an estimation of the effective joint channel, e.g., with the effective joint channel being represented as $H_{eff}$. Accordingly, at operation 509, the UE 504 may determine the joint channel information, including information estimating the effective joint channel $H_{eff}$, based on pair-wise estimation of individual components (e.g., two or more beam pair links between the UE 504 and the base station 502) according to Equation 3, supra.

In some other aspects, the joint channel information may include mutual information associated with the joint channel (e.g., effective joint channel), and the UE 504 may determine (e.g., compute, calculate, etc.) the mutual information based on a respective estimation of each of the individual components composing the joint channel (e.g., two or more beam pair links of the effective joint channel). For example, the mutual information associated with the joint channel may include a respective measurement value measured for each of the RSs 507 on resources on the two or more beams from the base station 502 having phase continuity. A respective measurement value may be based on at least one of an SNR, SINR, RSRP, and/or RSRQ measured for each of the RSs 507 on resources of the two or more beams having phase continuity.

Accordingly, the UE 504 may generate a group-based beam report 511 that includes the joint channel information, which may be determined by the UE 504 based on individual measurements corresponding to each of the two or more beams from the base station 502. For example, the group-based beam report 511 may include joint channel information that is based on one or more of a rank, a CQI (e.g., a per-stream CQI), a PMI, an LI, an SNR, an SINR, an RSRP, and/or an RSRQ individually determined for each of the two or more beams from the base station 502 on which the resources (e.g., CSI-RS resources) having phase continuity is transmitted. In some aspects, the UE 504 may generate the group-based beam report 511 based on the beam management configuration 501 and/or the (explicit or implicit) indication 503.

The UE 504 may then transmit the group-based beam report 511 to the base station 502. Correspondingly, the base station 502 may receive the group-based beam report 511 from the UE 504. At operation 513, the base station 502 may then configure two or more beams for TX/RX with the UE 504 based on the group-based beam report 511 (e.g., based on the joint channel information). For example, the base station 502 may select two or more beams for TX/RX by the UE 504 based on the group-based beam report 511 (e.g., based on the joint channel information). In some aspects of operation 513, the base station 502 may configure simultaneous TX/RX by the UE 504 using two or more selected beams based on the group-based beam report 511. In some other aspects of operation 513, the base station 502 may configure non-simultaneous TX/RX by the UE 504 using two or more selected beams based on the group-based beam report 511.

Accordingly, at operation 515, the base station 502 and the UE 504 may communicate using the two or more beams selected for TX/RX by the UE 504. For example, the base station 502 may transmit, to the UE 504, information configuring two or more beams (e.g., two or more beam pairs links) selected for TX/RX by the UE 504. In some aspects of operation 515, the UE 504 may communicate with the base station 502 using two or more beams selected for simultaneous TX/RX, e.g., based on the configuration of the two or more beams by the base station 502 according to the joint channel information included in the group-based beam report 511, as shown at operation 513. In some other aspects of operation 515, the UE 504 may communicate with the base station 502 using two or more beams selected for non-simultaneous TX/RX, e.g., based on the configuration of the two or more beams by the base station 502 according to the joint channel information included in the group-based beam report 511, as shown at operation 513.

Figure 6:
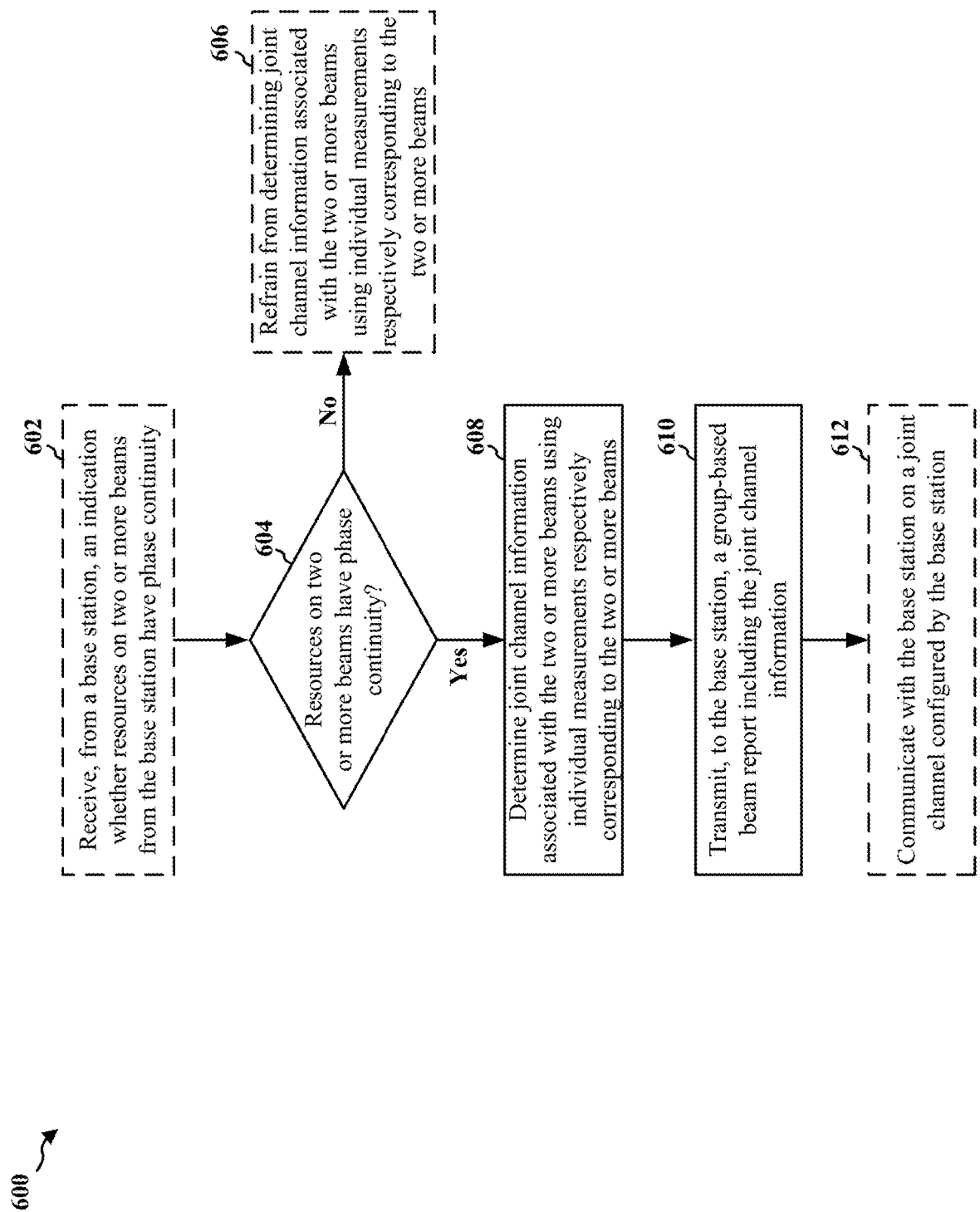
FIG. 6 is a flowchart of a method of wireless communication by a UE.

FIG. 6 is a flowchart of a method 600 of wireless communication. The method 600 may be performed by a UE or a component of a UE (e.g., the UE 104, 350, 404, 504; a processing system, which may include the memory 360 and which may be the entire UE 350 or a component of the UE 350, such as the TX processor 368, the RX processor 356, and/or the controller/processor 359) and/or an apparatus (e.g., an apparatus 802). According to various different aspects, one or more of the illustrated blocks of the method 600 may be transposed, omitted, and/or contemporaneously performed.

The method 600 may enable the UE to determine joint channel information and/or joint beam information (e.g., characteristics, properties, etc.) for multiple beams using individual measurements for the beams. The method 600 may improve beam management for TX/RX using multiple beams while reducing the overhead (e.g., signaling, processing, etc.) that may otherwise be commensurate with determination of joint beam information for multiple beams using individual measurements for the multiple beams.

At 602, the UE may receive, from a base station, an indication of whether resources on two or more beams from the base station have phase continuity. In some aspects, the indication may be explicit—e.g., a CSI reporting configuration enabling group-based beam reporting may include information explicitly indicating that CSI-RS resources configured by the CSI reporting configuration have phase continuity on two or more beams from the base station. In some other aspects, the indication may be implicit—e.g., the UE may derive the indication of whether resources on two or more beams from the base station have phase continuity based on some information or combination of different information received from the base station. For example, the indication may implicitly indicate that CSI-RS resources on two or more beams from the base station have phase continuity when the CSI-RS resources are configured by a CSI reporting configuration associated with a same CSI report configuration ID and/or associated with a same CSI report configuration enabling the group-based beam report. Illustratively, an implicit indication may be received by the UE informing the UE that CSI-RS resources 1, 4, 6, and 10 on a first set of two or more beams from the base station may be assumed to have phase continuity. Potentially, the implicit indication may indicate, to the UE, a second set of CSI-RS resources on two or more beams (e.g., two or more beams different from the first set) from the base station have phase continuity, but do not have phase continuity with CSI resources 1, 4, 6, and 10 on the first set of two or more beams from the base station. In effect, the UE may receive an indication of which RS resources may be grouped together to derive joint channel properties based on individual measurements respectively corresponding to beams of different multi-beam sets from the base station.

In the context of FIG. 5, the UE 504 may receive, from the base station 502, an indication 503 of whether RS resources on two or more beams from the base station 502 have phase continuity. In some aspects, the beam management configuration 501 may have information that explicitly or implicitly includes the indication 503.

At 604, the UE may determine whether resources on two or more beams from the base station have phase continuity. In some aspects, the UE may determine that resources on two or more beams from the base station have phase continuity based on the indication received from the base station. For example, the indication may be implicit so that the UE may determine that resources on the two or more beams from the base station have phase continuity based on application of at least one rule and/or relationship to information or a combination of different information received from the base station. Such rule(s) and/or relationship(s) may be preconfigured in the UE and/or may be configured in the UE by the base station.

Illustratively, the base station may enforce phase continuity for resources on beams that are associated with the same CSI reporting configuration in which group-based beam reporting is enabled when the CSI reporting configuration is associated with at least one specific multiplexing mode (e.g., at least one of TDM, FDM, and/or SDM) and/or at least one specific use case (e.g., eMBB and/or URLLC). For example, at least one rule and/or relationship may define that all CSI-RS resources configured by the same CSI reporting configuration enabling group-based beam reporting have phase continuity on two or more beams from the base station when the CSI reporting configuration is associated with an SDM multiplexing mode and/or is associated with eMBB use case. Thus, when the UE receives a CSI reporting configuration enabling group-based beam reporting and the CSI reporting configuration is for SDM and eMBB, the UE may determine that all CSI-RS resources configured by the CSI reporting configuration have phase continuity on two or more beams from the base station based on application of at least one rule and/or relationship to the information indicating that the CSI reporting configuration is for SDM and eMBB, which implicit indicates that the associated CSI-RS resources on two or more beams from the base station have phase continuity.

In the context of FIG. 5, at operation 505, the UE 504 may determine whether RS resources on two or more beams from the base station 502 have phase continuity. The UE 504 may determine whether the RS resources on the two or more beams from the base station 502 have phase continuity based on the (explicit or implicit) indication 503, which may be included in the beam management configuration 501.

If, at 604, the UE determines that the resources on two or more beams from the base station do not have phase continuity (e.g., the resources on two or more beams from the base station are phase discontinuous), then:

At 606, the UE may refrain from determining joint channel and/or joint beam information based on individual measurements respectively corresponding to the two or more beams. For example, the UE may receive RSs carried on resources on two or more beams from the base station, and the UE may individually measure values respectively corresponding to the two or more beams in response to receiving the RSs. However, the UE may refrain from using the individually measured values respectively corresponding to the two or more beams to determine joint channel and/or joint beam information (e.g., mutual information).

In the context of FIG. 5, at operation 505, if the UE 504 determines that RS resources on two or more beams from the base station 502 are phase discontinuous (e.g., based on the indication 503), then the UE 504 may refrain from determining joint channel information, as shown at operation 509, in response to receiving the RSs 507 on resources on two or more beams from the base station 502.

If, at 604, the UE determines that the resources on two or more beams from the base station do have phase continuity (e.g., the resources on two or more beams from the base station are phase discontinuous), then:

At 608, the UE may determine joint channel information associated with the two or more beams using individual measurements respectively corresponding to the two or more beams. For example, the UE may receive RSs (e.g., CSI-RSs and/or SSBs) on resources on two or more beams from the base station that have phase continuity. In some aspects, the UE may individually measure at least one measurement value for each RS received via each of the two or more beams from the base station. For example, the UE may individually measure at least one RSRP, RSRQ, SINR, and/or SNR value corresponding to each of the two or more beams in response to receiving a respective RS via each of the two or more beams from the base station. In another example, the UE may perform pair-wise estimation of individual components respectively associated with the two or more beams forming beam pair links with the base station, as shown in Equation 3, supra. The UE may determine the joint channel information based on the individually measured at least one measurement value received via each of the two or more beams from the base station and/or based on pair-wise estimation of individual components respectively associated with the two or more beams. For example, the UE may determine (e.g., calculate, compute, etc.) mutual information based on individual measurements respectively corresponding to the two or more beams from the base station and/or may determine (e.g., estimate, calculate, etc.) the effective (joint) channel $H_{eff}$ based on pair-wise estimation of individual components respectively associated with the two or more beams.

In the context of FIG. 5, at operation 509, the UE 504 may the UE 504 may determine joint channel information based on individual measurements for the RSs 507 carried on two or more resources on two or more beams from the base station 502 having phase continuity. Each of the individual measurements may correspond to a respective one of the two or more beams on which a respective one of the RSs 507 is received. In some aspects of operation 509, the UE 504 may determine the joint channel information, including information estimating the effective joint channel $H_{eff}$, based on pair-wise estimation of individual components (e.g., two or more beam pair links between the UE 504 and the base station 502) according to Equation 3, supra. In some other aspects of operation 509, the joint channel information may include mutual information associated with the joint channel (e.g., effective joint channel), and the UE 504 may determine (e.g., compute, calculate, etc.) the mutual information based on a respective measurement value measured for each of the RSs 507 on resources on the two or more beams from the base station 502 having phase continuity.

At 610, the UE may transmit, to the base station, a group-based beam report including the joint channel information. In some aspects, the group-based beam report may be based on a reporting configuration received from the base station, such as a CSI reporting configuration in which group-based beam reporting is enabled. In some aspects, the group-based beam report may indicate two or more measurement values respectively corresponding to two or more beams from the base station. For example, the UE may include, in the group-based beam report, a first measurement value corresponding to a representative beam, with the first measurement value being a "highest" or "best" measurement value relative to other measurement values corresponding to other beams. In addition, the UE may include, in the group-based beam report, one or more other measurement values respectively corresponding to one or more other beams, such as the next highest or next best measurement value(s); however, the one or more other measurement values may be differentially represented relative to the first measurement value.

In the context of FIG. 5, the UE 504 may transmit, to the base station 502, the group-based beam report 511 including joint channel information, which may be determined by the UE 504 based on individual measurements corresponding to each of the two or more beams from the base station 502. For example, the group-based beam report 511 may include joint channel information that is based on one or more of a rank, a CQI (e.g., a per-stream CQI), a PMI, an LI, an SNR, an SINR, an RSRP, and/or an RSRQ individually determined for each of the two or more beams from the base station 502 on which the resources (e.g., CSI-RS resources) having phase continuity are transmitted.

At 612, the UE may communicate with the base station on a joint channel configured by the base station. For example, the UE may receive, from the base station, information configuring the joint channel in response to the group-based beam report. The UE may be configured for TX/RX, which may or may not be simultaneous, using two or more beams selected by the base station based on the group-based beam report. For example, the UE may receive signaling from the base station using multiple (simultaneous) spatial filters, that may be configured for the UE based on the group-based beam report. The UE may receive, from the base station, data and/or control information on the joint channel using the two or more beams selected by the base station.

In the context of FIG. 5, the UE 504 may communicate with the base station 502 using the two or more beams selected for TX/RX of the UE 504 based on the group-based beam report 511, as shown at operation 515. For example, the UE 504 may receive, from the base station 502, information configuring two or more beams (e.g., two or more beam pairs links) selected for TX/RX by the UE 504 based on the joint channel information included in the group-based beam report 511, as shown at operation 513.

Figure 7:
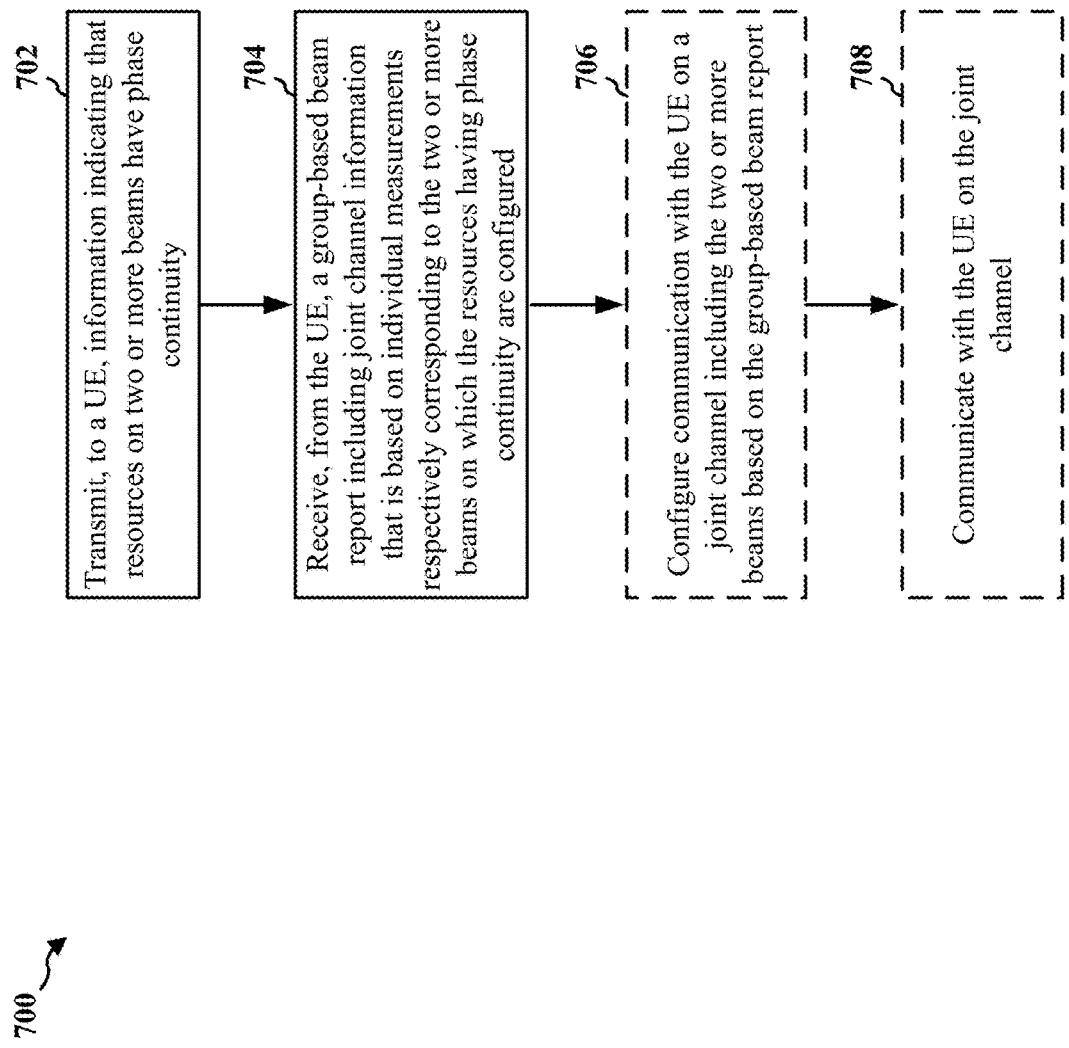
FIG. 7 is a flowchart of a method of wireless communication by a base station.

FIG. 7 is a flowchart of a method 700 of wireless communication. The method 700 may be performed by a base station or a component of a base station (e.g., the base station 102/180, 310, 402, 502; a processing system, which may include the memory 376 and which may be the entire base station 310 or a component of the base station 310, such as the TX processor 316, the RX processor 370, and/or the controller/processor 375) and/or an apparatus (e.g., an apparatus 902). According to various different aspects, one or more of the illustrated blocks of the method 700 may be transposed, omitted, and/or contemporaneously performed.

The method 700 may assist a base station in more accurately determining joint channel and/or joint beam information (e.g., properties and/or characteristics) for communication with a UE using multiple beams based on individual measurements respectively corresponding to the beams. The method 700 may improve beam management for TX/RX using multiple beams while reducing the overhead (e.g., signaling, processing, etc.) that may otherwise be commensurate with determination of joint beam characteristics for multiple beams using individual measurements for the multiple beams.

At 702, the base station may transmit, to a UE, an indication that two or more resources on two or more beams from the base station have phase continuity. For example, the indication may assist the UE in determining that respective RSs carried on two or more RS resources respectively on two or more beams from the base station have phase continuity. According to different aspects, the indication may be implicit, explicit, or a combination thereof. For example, the indication may be included in an CSI reporting configuration, which may enable group-based beam reporting by the UE.

Some aspects of such an indication may include an implicit indication that is based on at least one rule and/or relationship, which may be preconfigured (e.g., in the base station and/or the UE) or may be configured by the base station for the UE. The base station may apply and/or enforce phase continuity across two or more resources on two or more beams from the base station according to at least one rule and/or relationship for at least one multiplexing mode and/or at least one use case associated with CSI reporting by the UE. According to at least one rule and/or relationship, for example, the base station may apply and/or enforce phase continuity across two or more resources on two or more beams from the base station when the UE is configured for CSI reporting that is associated with an SDM multiplexing mode and/or eMBB use case. In other examples, the multiplexing mode may include at least one of FDM, SDM, and/or TDM, while the use case may include eMBB and/or URLLC.

Some other aspects of such an indication may include an indication that CSI-RS resources configured for the UE by the base station have phase continuity on two or more beams from the base station when associated with a same CSI report configuration ID and/or a same CSI report configuration in which group-based beam reporting is enabled. For example, such other aspects of an indication may be explicitly signaled by the base station to the UE.

Some further aspects of such an indication may indicate respective groups of RS resources on different sets of two or more beams from the base station, and each respective group of RS resources on a respective set of two or more beams from the base station may have phase continuity within the group of RS resources, but not necessarily across groups of RS resources. In other words, the base station may indicate multiple groups of CSI-RS resources having phase continuity within a respective group. Thus, the base station may indicate, to the UE, which CSI-RS resources may be grouped together to derive joint channel properties based on individual measurements respectively corresponding to two or more beams on which one or more groups of CSI-RS resources having phase continuity are configured.

For example, the base station apply and/or enforce phase continuity across a first group of CSI-RS resources 1, 4, 6, and 10 on a first set of two or more beams from the base station, and the base station may transmit an indication of the same to the UE. Additionally, the base station may apply and/or enforce phase continuity across a second set of CSI-RS resources (e.g., other than CSI-RS resources 1, 4, 6, and 10) on a second set of two or more beams from the base station, and the base station may transmit, to the UE, and indication that the second set of CSI-RS resources on the second set of two or more beams from the base station have phase continuity. However, the base station may not apply and/or enforce phase continuity between the first and second groups of CSI-RS resources respectively on the first and second sets of beams from the base station. Therefore, the UE may not assume phase continuity across the first and second groups of CSI-RS resources respectively on the first and second sets of beams from the base station.

In the context of FIG. 5, the base station 502 may transmit, to the UE 504, an indication 503 of whether RS resources on two or more beams from the base station 502 have phase continuity. In some aspects, the beam management configuration 501 may have information that explicitly or implicitly includes the indication 503.

At 704, the base station may receive, from the UE, a group-based beam report including joint channel information that is based on individual measurements respectively corresponding to the two or more beams on which the resources having phase continuity are configured. For example, the group-based beam report may include joint channel information that is based on individual measurement values respectively measured by the UE using RSs (e.g., CSI-RSs and/or SSBs) on resources on two or more beams from the base station that have phase continuity. The group-based beam report may be based on a CSI reporting configuration transmitted to the UE by the base station, such as a CSI reporting configuration enabling group-based beam reporting by the UE and/or (explicitly or implicitly) indicating resources on two or more beams from the base station having phase continuity.

In some aspects, the joint channel information may include mutual information determined by the UE from RSs on resources on two or more beams from the base station having phase continuity. For example, the joint channel information, e.g., mutual information, may be based on at least one respective RSRP, RSRQ, SINR, and/or SNR measurement value, measured by the UE, corresponding to each of the two or more beams on which RS resources having phase continuity are configured.

In some other aspects, the joint channel information may include information indicating estimation of the effective (joint) channel $H_{eff}$. For example, the joint channel information may include information associated with the effective joint channel $H_{eff}$ that is based on pair-wise estimation, by the UE, of individual components respectively associated with the two or more beams forming beam pair links with the base station, e.g., as shown in Equation 3, supra.

In some further aspects, the group-based beam report may include information indicating two or more measurement values respectively corresponding to two or more beams from the base station. For example, the group-based beam report may include a first measurement value corresponding to a representative beam, which may be a beam corresponding to a "highest" or "best" measurement value measured by the UE relative to other measurement values measured corresponding to other beams. In addition, the group-based beam report may include one or more other measurement values measured by the UE that respectively correspond to one or more other beams, such as the next highest or next best measurement value(s) measured by the UE; however, the one or more other measurement values may be differentially represented relative to the first measurement value in the group-based beam report.

In the context of FIG. 5, the base station 502 may receive, from the UE 504, the group-based beam report 511 including joint channel information, which may be determined by the UE 504 based on individual measurements corresponding to each of the two or more beams from the base station 502. In some aspects, the group-based beam report 511 may include joint channel information (e.g., mutual information) that is based on one or more of a rank, a CQI (e.g., a per-stream CQI), a PMI, an LI, an SNR, an SINR, an RSRP, and/or an RSRQ individually determined for each of the two or more beams from the base station 502 on which the resources (e.g., CSI-RS resources) having phase continuity are transmitted. In some other aspects, the group-based beam report may include joint channel information indicating estimation of the effective joint channel $H_{eff}$ by the UE 504 based on pair-wise estimation of individual components (e.g., two or more beam pair links between the UE 504 and the base station 502), e.g., according to Equation 3, supra. In some further aspects, the group-based beam report 511 may include two or more measurement values (e.g., measured by the UE 504 based on RSs 507 received via the two or more beams from the base station 502) respectively corresponding to two or more beams from the base station 502, such as two or more beams on which RS resources having phase continuity are configured.

At 706, the base station may configure communication with the UE on a joint channel including two or more beams based on the group-based beam report. In some aspects, the base station may configure simultaneous TX/RX for the UE based on the group-based beam report—e.g., the base station may configure multiple simultaneous spatial filters of the UE based on the group-based beam report. In some other aspects, the base station may configure non-simultaneous TX/RX for the UE (e.g., TDM communication) based on the group-based beam report—e.g., the base station may configure multiple non-simultaneous spatial filters of the UE based on the group-based beam report.

In some aspects, the base station may select two or more beams on a joint channel for multi-beam communication with the UE based on the group-based beam report (e.g., based on the joint channel information). For example, the base station may select the two or more beams on the joint channel based on joint channel information indicating estimation of the effective joint channel $H_{eff}$ by the UE that is based on pair-wise estimation of individual components by the UE (e.g., two or more beam pair links between the UE and the base station). Additionally or alternatively, the base station may select the two or more beams on the joint channel based on mutual information determined (e.g., computed, calculated, etc.) by the UE from individual measurements respectively corresponding to the two or more beams.

In the context of FIG. 5, at operation 513, the base station 502 may configure two or more beams for TX/RX with the UE 504 based on the group-based beam report 511 (e.g., based on the joint channel information). For example, the base station 502 may select two or more beams for TX/RX by the UE 504 based on the group-based beam report 511 (e.g., based on the joint channel information). In some aspects of operation 513, the base station 502 may configure simultaneous TX/RX by the UE 504 using two or more selected beams based on the group-based beam report 511. In some other aspects of operation 513, the base station 502 may configure non-simultaneous TX/RX by the UE 504 using two or more selected beams based on the group-based beam report 511. The base station 502 may transmit, to the UE 504, information configuring two or more beams (e.g., two or more beam pairs links) selected for TX/RX by the UE 504.

At 708, the base station may communicate with the UE on the joint channel configured by the base station. For example, the base station may transmit, to the UE, information configuring the joint channel in response to the group-based beam report, such as information indicating two or more beams selected by the base station for the joint channel based on the joint channel information included in the group-based beam report. In some aspects, the base station may transmit, to the UE, data and/or control information on the joint channel using the two or more beams selected by the base station.

In the context of FIG. 5, at operation 515, the base station 502 and the UE 504 may communicate on the joint using the two or more beams selected for TX/RX by the UE 504. For example, the base station 502 may transmit data and/or control information to the UE 504 using two or more selected beams, for example, simultaneously (e.g., in an SDM multiplexing mode) or non-simultaneously (e.g., in a TDM multiplexing mode).

Figure 8:
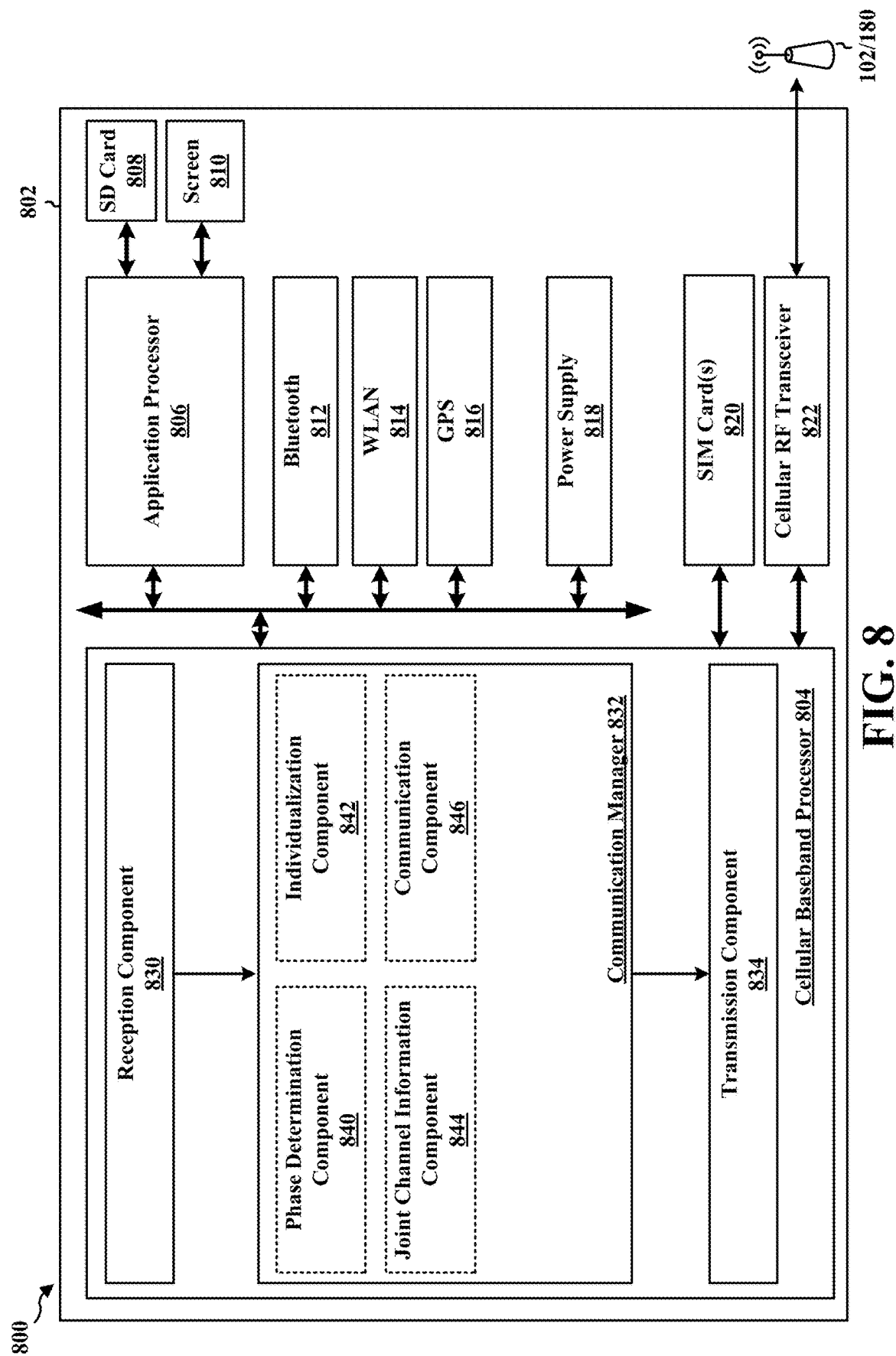
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The reception component 830 may be configured to receive, from the base station 102/180, an indication that two or more resources on two or more beams from the base station have phase continuity, e.g., as described in connection with 602 of FIG. 6. The indication may be explicit, implicit, or a combination thereof. In some aspects, the indication may be included in a CSI report configuration enabling group-based beam reporting by the apparatus 802. For example, the CSI report configuration may configure the two or more resources on the two or more beams having phase continuity.

The CSI report configuration may be associated with at least one of a multiplexing mode and/or a use case. For example, the at least one of the multiplexing mode and/or the use case may include at least one of a TDM mode, FDM mode, and/or SDM mode, and/or at least one of an eMBB use case and/or a URLLC use case.

According to various aspects, the communication manager 832 may include a phase determination component 840 that is configured to determine that two or more resources one two or more beams from the base station 102/180 have phase continuity, e.g., as described in connection with 604 of FIG. 6. The phase determination component 840 may receive input(s), such as the indication from the reception component 930, and the two or more resources on the two or more beams from the base station may be determined to have the phase continuity based on the indication.

For example, the phase determination component 840 may determine that the two or more resources on the two or more beams from the base station have phase continuity based on at least one rule and/or relationship that defines the at least one of the multiplexing mode and/or the use case associated with the CSI report configuration implicitly indicates that the resources configured by the CSI report configuration have phase continuity on the two or more beams from the base station 102/180—e.g., the at least one of the multiplexing mode and/or the use case associated with the CSI report configuration may include a SDM mode and an eMBB use case.

In some aspects, the reception component 830 may receive, from the base station 102/180, at least one of a CSI-RS and/or an SSB on a respective resource of the two or more resources on a respective beam of the two or more beams. The communication manager 832 may further include an individualization component 842 that receives, as input(s) from the reception component 830, the CSI-RSs and/or SSBs on the two or more resources on the two or more beams from the base station 102/180. The individualization component 842 may be configured to determine each of two or more individual measurements corresponding to a respective beam of the two or more beams based on the at least one of the CSI-RS and/or the SSB carried on a respective resource of the two or more resources on the respective beam of the two or more beams. For example, each of the two or more individual measurements may include at least one value measured for an RSRP, RSRQ, SINR, and/or SNR based on receiving the at least one of the CSI-RS and/or the SSB carried on a respective resource of the two or more resources on the respective beam of the two or more beams.

In some further aspects, the individualization component 842 may determine the individual measurements respectively corresponding to the two or more beams by performing pair-wise estimation of individual components associated with the two or more beams from the base station 102/180 (e.g., as shown in Equation 3, supra). The pair-wise estimation of the individual components may be further associated with two or more beams of the apparatus 802, such as two or more RX beams of the apparatus 802 respectively paired with two or more TX beams of the base station 102/180 to form two or more beam-pair links.

The communication manager 832 may further include a joint channel information component 844, which may receive, as input(s) from the phase determination component 840, information indicating a determination of whether the two or more resources on the two or more beams from the base station 102/180 have phase continuity or do not have phase continuity (e.g., are phase discontinuous). The joint channel information component 844 may be configured to refrain from determining joint channel information associated with the two or more beams using individual measurements respectively corresponding to the two or more beams in response to a determination that the two or more resources on the two or more beams from the base station 102/180 do not have phase continuity (e.g., according to the input(s) received from the phase determination component 840) e.g., as described in connection with 606 of FIG. 6.

The joint channel information component 844 may be further configured to receive, as input(s) from the individualization component 842, the individual measurements respectively corresponding to the two or more beams from the base station 102/180. In some aspects, the joint channel information component 844 may be configured to determine, based on the two or more resources on the two or more beams having phase continuity (e.g., according to the input(s) received from the phase determination component 840), joint channel information associated with the two or more beams using individual measurements respectively corresponding to the two or more beams, e.g., as described in connection with 608 of FIG. 6.

According to one example, the joint channel information component 844 may be configured to determine joint channel information associated with the two or more beams by determining (e.g., estimating, computing, calculating, etc.) an effective (joint) channel (e.g., as shown in Equation 3, supra), which may be based on input(s) received from the individualization component 842 indicating pair-wise estimation of individual components associated with the two or more beams from the base station 102/180.

According to another example, the joint channel information component 844 may be configured to determine joint channel information associated with the two or more beams by determining (e.g., estimating, computing, calculating, etc.) mutual information, which may be based on input(s) received from the individualization component 842 indicating the individual measurements respectively corresponding to the two or more beams.

The joint channel information component 844 may be configured to provide, as input(s) to the transmission component 834, the joint channel information associated with the two or more beams from the base station 102/180. The transmission component 834 may be configured to transmit, to the base station 102/180, a group-based beam report that includes the joint channel information associated with the two or more beams from the base station 102/180, e.g., as described in connection with 610 of FIG. 6.

The reception component 830 may be further configured to receive, from the base station 102/180 based on the group-based beam report, information configuring communication with the base station 102/180 on a joint channel that includes the two or more beams from the base station 102/180 respectively paired with two or more beams from the apparatus 802. In some aspects, the information configuring the communication with the base station 102/180 on the joint channel may further include information configuring TX/RX using the two or more beams from the apparatus 802 respectively paired with the two or more beams from the base station 102/180. For example, the information configuring the TX/RX may configure at least one of simultaneous TX/RX or non-simultaneous TX/RX that is time-division multiplexed.

The communication manager 832 may further include a communication component 846, which may receive, as input(s) from the reception component 830, the information configuring communication with the base station 102/180 on the joint channel that includes the two or more beams from the base station 102/180 respectively paired with the two or more beams from the apparatus 802. The communication component 846 may be configured to communicate with the base station 102/180 on the joint channel configured by the base station 102/180, e.g., as described in connection with 612 of FIG. 6. For example, the communication component 846 may be configured to communicate with the base station 102/180 on the joint channel configured by the base station 102/180 based on the information configuring communication with the base station 102/180 on the joint channel that includes the two or more beams from the base station 102/180 respectively paired with the two or more beams from the apparatus 802 (e.g., received as input(s) from the reception component 830).

The apparatus 802 may include additional components that perform some or all of the blocks, operations, signaling, etc. of the algorithms in the aforementioned call flow diagram of FIG. 5 and/or flowchart of FIG. 6. As such, some or all of the blocks, operations, signaling, etc. in the aforementioned call flow diagram of FIG. 5 and/or flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for determining that two or more resources on two or more beams from a base station have phase continuity; means for determining, based on the two or more resources on the two or more beams having the phase continuity, joint channel information associated with the two or more beams using individual measurements respectively corresponding to the two or more beams; and means for transmitting, to the base station, a group-based beam report including the joint channel information associated with the two or more beams.

In some aspects, the apparatus 802, and in particular the cellular baseband processor 804, may further include means for receiving, from the base station, an indication that the two or more resources on the two or more beams from the base station have the phase continuity. The two or more resources on the two or more beams from the base station may be determined to have the phase continuity based on the indication.

In some aspects, the indication includes a CSI report configuration enabling group-based beam reporting, and the CSI report configuration configures the two or more resources on the two or more beams having the phase continuity.

In some aspects, the CSI report configuration is associated with at least one of a multiplexing mode or a use case, and the two or more resources on the two or more beams from the base station are determined to have the phase continuity based on the at least one of the multiplexing mode or the use case.

In some aspects, the at least one of the multiplexing mode or the use case includes at least one of a TDM mode, FDM mode, and/or SDM mode, and/or at least one of an eMBB use case and/or a URLLC use case.

In some aspects, each of the two or more resources carries at least one of a CSI-RS and/or an SSB.

In some aspects, the apparatus 802, and in particular the cellular baseband processor 804, may further include means for determining each of the individual measurements corresponding to a respective beam of the two or more beams based on at least one of the CSI-RS or the SSB carried on a respective resource of the two or more resources on the respective beam of the two or more beams.

In some aspects, the joint channel information includes information estimating an effective joint channel that is based on pair-wise estimation of individual components respectively associated with each of the two or more beams.

In some aspects, the joint channel information includes mutual information that is based on the individual measurements respectively corresponding to the two or more beams.

In some aspects, the apparatus 802, and in particular the cellular baseband processor 804, may further include means for receiving, from the base station based on the group-based beam report, information configuring communication with the base station on a joint channel that includes the two or more beams from the base station respectively paired with two or more beams from the apparatus 802; and means for communicating with the base station on the joint channel based on the information configuring the communication with the base station on the joint channel.

In some aspects, the information configuring the communication with the base station on the joint channel further includes information configuring TX/RX using the two or more beams from the apparatus 802 respectively paired with the two or more beams from the base station, and the information configuring the TX/RX configures at least one of simultaneous TX/RX or non-simultaneous TX/RX that is time-division multiplexed.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
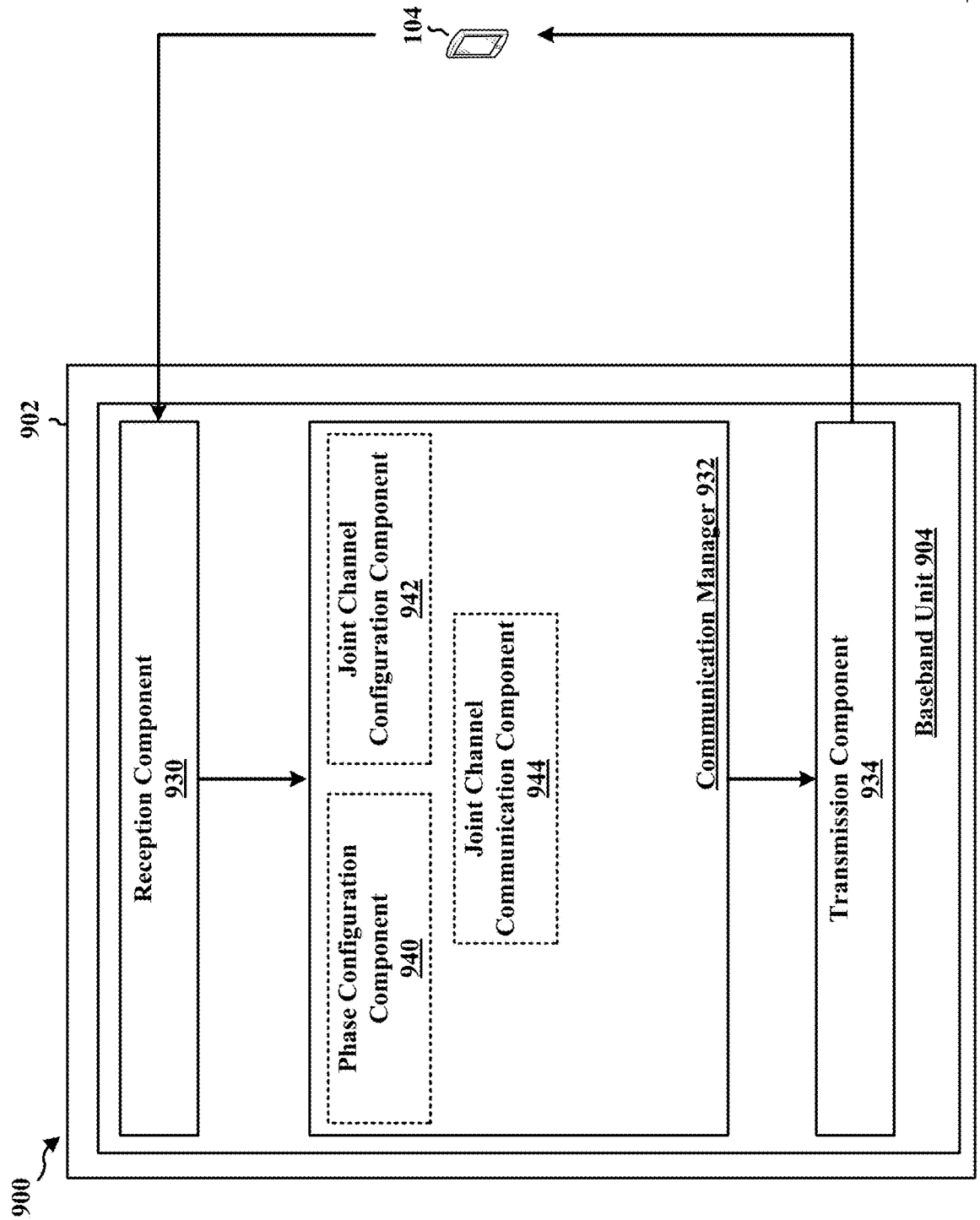
FIG. 9 is a diagram illustrating another example of a hardware implementation for another example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

In some aspects, the communication manager 932 may include a phase configuration component 940 that is configured to apply and/or enforce phase continuity across two or more resources on two or more beams from the apparatus 902. For example, each of the two or more resources may be configured to carry at least one of a CSI-RS and/or an SSB.

The phase configuration component 940 may provide, as input(s) to the transmission component 934, information indicating that the two or more resources on the two or more beams from the apparatus 902 have phase continuity. The transmission component 934 may be configured to transmit, to the UE 104, an indication that the two or more resources on the two or more beams from the apparatus 902 have phase continuity, e.g., as described in connection with 702 of FIG. 7. The indication may be implicit, explicit, or some combination thereof.

In some aspects, the indication may include a CSI report configuration enabling group-based beam reporting by the UE 104. For example, the CSI report configuration may configure the two or more resources on the two or more beams having phase continuity.

Potentially, the CSI report configuration may be associated with at least one of a multiplexing mode and/or a use case, and the indication includes the at least one of the multiplexing mode and/or the use case. For example, the at least one of the multiplexing mode and/or the use case may include at least one of a TDM mode, FDM mode, and/or SDM mode, and/or at least one of an eMBB use case and/or a URLLC use case.

The reception component 930 may be configured to receive, from the UE 104, a group-based beam report including joint channel information that is based on individual measurements respectively corresponding to the two or more beams on which the two or more resources having phase continuity are configured, e.g., as described in connection with 704 of FIG. 7. The reception component 930 may be configured to receive the group-based beam report from the UE 104 based on the transmitted indication.

In some aspects, the joint channel information may include information estimating an effective (joint) channel that is based on pair-wise estimation by the UE 104 of individual components respectively associated with the two or more beams from the apparatus 902. In some other aspects, the joint channel information associated with the two or more beams from the apparatus 902 is based on individual measurements by the UE 104 that respectively correspond to the two or more beams from the apparatus 902. For example, the joint channel information may include mutual information determined by the UE 104 based on the individual measurements by the UE that respectively correspond to the two or more beams.

In some aspects, the communication manager 932 may include a joint channel configuration component 942 that receives, as input(s) from the reception component 930, the group-based beam report including joint channel information that is based on individual measurements respectively corresponding to the two or more beams on which the two or more resources having phase continuity are configured. The joint channel configuration component 942 may be configured to configure, based on the group-based beam report, communication with the UE 104 on a joint channel that includes the two or more beams from the apparatus 902 respectively paired with two or more beams from the UE 104, e.g., as described in connection with 706 of FIG. 7.

For example, the joint channel configuration component 942 may configure, based on the group-based beam report, the communication with the UE 104 on the joint channel by configuring TX/RX using the two or more beams from the UE 104 respectively paired with the two or more beams from the apparatus 902. The TX/RX using the two or more beams from the UE 104 respectively paired with the two or more beams from the apparatus 902 may include at least one of simultaneous TX/RX or non-simultaneous TX/RX that is time-division multiplexed.

In some aspects, the transmission component 934 may receive, as input(s) from the joint channel configuration component 942, information indicating the configuration of the communication with the UE 104 on the joint channel that includes the two or more beams from the apparatus 902 respectively paired with two or more beams from the UE 104. The transmission component 934 may be further configured to transmit, to the UE 104, the information indicating the configuration of the communication with the UE 104 on the joint channel that includes the two or more beams from the apparatus 902 respectively paired with two or more beams from the UE 104.

In some aspects, the communication manager 932 may include a joint channel communication component 944 that receives, as input(s) from the joint channel configuration component 942, information indicating the configuration of the communication with the UE 104 on the joint channel that includes the two or more beams from the apparatus 902 respectively paired with two or more beams from the UE 104. The joint channel communication component 944 may be configured to communicate with the UE 104 on the joint channel, e.g., as described in connection with 708 of FIG. 7. For example, the joint channel communication component 944 may communicate with the UE 104 on the joint channel based on transmission, to the UE 104 by the transmission component 934, of the information configuring the communication with the UE 104 on the joint channel.

The apparatus 902 may include additional components that perform some or all of the blocks, operations, signaling, etc. of the algorithms in the aforementioned call flow diagram of FIG. 5 and/or flowchart of FIG. 7. As such, some or all of the blocks, operations, signaling, etc. in the aforementioned call flow diagram of FIG. 5 and/or flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for transmitting, to a UE, an indication that two or more resources on two or more beams from the apparatus 902 have phase continuity; and means for receiving, from the UE based on the indication, a group-based beam report including joint channel information associated with the two or more beams.

In some aspects, the joint channel information includes information estimating an effective joint channel that is based on pair-wise estimation by the UE of individual components respectively associated with the two or more beams.

In some aspects, the joint channel information associated with the two or more beams from the apparatus 902 is based on individual measurements by the UE that respectively correspond to the two or more beams.

In some aspects, the joint channel information includes mutual information determined by the UE based on the individual measurements by the UE that respectively correspond to the two or more beams.

In some aspects, the indication includes a CSI report configuration enabling group-based beam reporting by the UE, and the CSI report configuration configures the two or more resources on the two or more beams having the phase continuity.

In some aspects, the CSI report configuration is associated with at least one of a multiplexing mode and/or a use case, and the indication comprises the at least one of the multiplexing mode and/or the use case.

In some aspects, the at least one of the multiplexing mode and/or the use case includes at least one of a TDM mode, FDM mode, and/or SDM mode, and/or at least one of an eMBB use case and/or a URLLC use case.

In some aspects, each of the two or more resources carries at least one of a CSI-RS and/or an SSB.

In some aspects, the apparatus 902, and in particular the baseband unit 904, may further include means for configuring, based on the group-based beam report, communication with the UE on a joint channel that includes the two or more beams from the apparatus 902 respectively paired with two or more beams from the UE; and means for communication with the UE on the joint channel based on transmitting, to the UE, information configuring the communication with the UE on the joint channel.

In some aspects, the means for the configuring, based on the group-based beam report, the communication with the UE on the joint channel is configured to configure TX/RX using the two or more beams from the UE respectively paired with the two or more beams from the apparatus 902, and the TX/RX using the two or more beams from the UE respectively paired with the two or more beams from the apparatus 902 includes at least one of simultaneous TX/RX or non-simultaneous TX/RX that is time-division multiplexed.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a UE configured to determine that two or more resources on two or more beams from a base station have phase continuity; determining, based on the two or more resources on the two or more beams having the phase continuity, joint channel information associated with the two or more beams using individual measurements respectively corresponding to the two or more beams; and transmit, to the base station, a group-based beam report including the joint channel information associated with the two or more beams.

Example 2 is the UE of Example 1, further configured to receive, from the base station, an indication that the two or more resources on the two or more beams from the base station have the phase continuity, and the two or more resources on the two or more beams from the base station are determined to have the phase continuity based on the indication.

Example 3 is the UE of Example 2, and the indication comprises a CSI report configuration enabling group-based beam reporting, and the CSI report configuration configures the two or more resources on the two or more beams having the phase continuity.

Example 4 is the UE of Example 3, and the CSI report configuration is associated with at least one of a multiplexing mode or a use case, and the two or more resources on the two or more beams from the base station are determined to have the phase continuity based on the at least one of the multiplexing mode or the use case.

Example 5 is the UE of Example 4, and the at least one of the multiplexing mode or the use case comprises at least one of a TDM mode, FDM mode, or SDM mode, or at least one of an eMBB use case or a URLLC use case.

Example 6 is the UE of any of Examples 1 through 5, and each of the two or more resources carries at least one of a CSI-RS or an SSB.

Example 7 is the UE of Example 6, further configured to determine each of the individual measurements corresponding to a respective beam of the two or more beams based on at least one of the CSI-RS or the SSB carried on a respective resource of the two or more resources on the respective beam of the two or more beams.

Example 8 is the UE of any of Examples 1 through 7, and the joint channel information comprises information estimating an effective joint channel that is based on pair-wise estimation of individual components respectively associated with each of the two or more beams.

Example 9 is the UE of any of Examples 1 through 8, and the joint channel information comprises mutual information that is based on the individual measurements respectively corresponding to the two or more beams.

Example 10 is the UE of any of Examples 1 through 9, further configured to receive, from the base station based on the group-based beam report, information configuring communication with the base station on a joint channel that includes the two or more beams from the base station respectively paired with two or more beams from the UE; and communicate with the base station on the joint channel based on the information configuring the communication with the base station on the joint channel.

Example 11 is the UE of Example 10, and the information configuring the communication with the base station on the joint channel further comprises information configuring TX/RX using the two or more beams from the UE respectively paired with the two or more beams from the base station, and the information configuring the TX/RX configures at least one of simultaneous TX/RX or non-simultaneous TX/RX that is time-division multiplexed.

Example 12 is a base station configured to transmit, to a UE, an indication that two or more resources on two or more beams from the base station have phase continuity; and receive, from the UE based on the indication, a group-based beam report including joint channel information associated with the two or more beams.

Example 13 is the base station of Example 12, and the joint channel information comprises information estimating an effective joint channel that is based on pair-wise estimation by the UE of individual components respectively associated with the two or more beams.

Example 14 is the base station of Example 12 or Example 13, and the joint channel information associated with the two or more beams from the base station is based on individual measurements by the UE that respectively correspond to the two or more beams.

Example 15 is the base station of Example 14, and the joint channel information comprises mutual information determined by the UE based on the individual measurements by the UE that respectively correspond to the two or more beams.

Example 16 is the base station of any of Examples 12 through 15, and the indication comprises a CSI report configuration enabling group-based beam reporting by the UE, and the CSI report configuration configures the two or more resources on the two or more beams having the phase continuity.

Example 17 is the base station of Example 16, and the CSI report configuration is associated with at least one of a multiplexing mode or a use case, and the indication comprises the at least one of the multiplexing mode or the use case.

Example 18 is the base station of Example 17, and the at least one of the multiplexing mode or the use case comprises at least one of a TDM mode, FDM mode, or SDM mode, or at least one of an eMBB use case or a URLLC use case.

Example 19 is the base station of any of Examples 12 through 18, and each of the two or more resources carries at least one of a CSI-RS or an SSB.

Example 20 is the base station of any of Examples 12 through 19, further configured to configure, based on the group-based beam report, communication with the UE on a joint channel that includes the two or more beams from the base station respectively paired with two or more beams from the UE; and communicate with the UE on the joint channel based on transmission, to the UE, of information configuring the communication with the UE on the joint channel.

Example 21 is the base station of Example 20, and the configuration, based on the group-based beam report, the communication with the UE on the joint channel comprises: configuration of TX/RX using the two or more beams from the UE respectively paired with the two or more beams from the base station, and the TX/RX using the two or more beams from the UE respectively paired with the two or more beams from the base station comprises at least one of simultaneous TX/RX or non-simultaneous TX/RX that is time-division multiplexed.

What is claimed is:

1. A method of wireless communication at a user equipment (UE), comprising:
   estimating, for two or more resources on two or more beams having phase continuity, an effective joint channel associated with the two or more beams based on individual measurements respectively corresponding to the two or more beams; and
   transmitting, to the base station, a group-based beam report including joint channel information that indicates the effective joint channel.

2. The method of claim 1, further comprising:
   receiving, from the base station, an indication that the two or more resources on the two or more beams from the base station have the phase continuity,
   wherein the two or more resources on the two or more beams from the base station are determined to have the phase continuity based on the indication.

3. The method of claim 2, wherein the indication comprises a channel state information (CSI) report configuration enabling group-based beam reporting, and wherein the CSI report configuration configures the two or more resources on the two or more beams having the phase continuity.

4. The method of claim 3, wherein the CSI report configuration is associated with at least one of a multiplexing mode or a use case, and wherein the two or more resources on the two or more beams from the base station are determined to have the phase continuity based on the at least one of the multiplexing mode or the use case.

5. The method of claim 4, wherein the at least one of the multiplexing mode or the use case comprises at least one of a time-division multiplexing (TDM) mode, frequency-division multiplexing (FDM) mode, or spatial-division multiplexing (SDM) mode, or at least one of an enhanced mobile broadband (eMBB) use case or an ultra-reliable low-latency communication (URLLC) use case.

6. The method of claim 1, wherein each of the two or more resources carries at least one of a channel state information (CSI) reference signal (RS) or a synchronization signal block (SSB).

7. The method of claim 6, further comprising:
   determining each of the individual measurements corresponding to a respective beam of the two or more beams based on at least one of the CSI-RS or the SSB carried on a respective resource of the two or more resources on the respective beam of the two or more beams.

8. The method of claim 1, wherein the joint channel information comprises information estimating an effective joint channel that is based on pair-wise estimation of individual components respectively associated with each of the two or more beams.

9. The method of claim 1, wherein the joint channel information comprises mutual information that is based on the individual measurements respectively corresponding to the two or more beams.

10. The method of claim 1, further comprising:
    receiving, from the base station based on the group-based beam report, information configuring communication with the base station on a joint channel that includes the two or more beams from the base station respectively paired with two or more beams from the UE; and
    communicating with the base station on the joint channel based on the information configuring the communication with the base station on the joint channel.

11. The method of claim 10, wherein the information configuring the communication with the base station on the joint channel further comprises information configuring transmission/reception using the two or more beams from the UE respectively paired with the two or more beams from the base station, and wherein the information configuring the transmission/reception configures at least one of simultaneous transmission/reception or non-simultaneous transmission/reception that is time-division multiplexed.

12. A method of wireless communication by a base station, comprising:
    transmitting, to a user equipment (UE), an indication that two or more resources on two or more beams from the base station have phase continuity; and
    receiving, from the UE, a group-based beam report including joint channel information that indicates an estimation of an effective joint channel associated with the two or more beams, wherein the estimation of the effective joint channel is based on individual measurements respectively corresponding to the two or more beams.

13. The method of claim 12, wherein the joint channel information comprises information estimating an effective joint channel that is based on pair-wise estimation by the UE of individual components respectively associated with the two or more beams.

14. The method of claim 12, wherein the joint channel information associated with the two or more beams from the base station is based on individual measurements by the UE that respectively correspond to the two or more beams.

15. The method of claim 14, wherein the joint channel information comprises mutual information determined by the UE based on the individual measurements by the UE that respectively correspond to the two or more beams.

16. The method of claim 12, wherein the indication comprises a channel state information (CSI) report configuration enabling group-based beam reporting by the UE, and wherein the CSI report configuration configures the two or more resources on the two or more beams having the phase continuity.

17. The method of claim 16, wherein the CSI report configuration is associated with at least one of a multiplexing mode or a use case, and wherein the indication comprises the at least one of the multiplexing mode or the use case.

18. The method of claim 17, wherein the at least one of the multiplexing mode or the use case comprises at least one of a time-division multiplexing (TDM) mode, frequency-division multiplexing (FDM) mode, or spatial-division multiplexing (SDM) mode, or at least one of an enhanced mobile broadband (eMBB) use case or an ultra-reliable low-latency communication (URLLC) use case.

19. The method of claim 12, wherein each of the two or more resources carries at least one of a channel state information (CSI) reference signal (RS) or a synchronization signal block (SSB).

20. The method of claim 12, further comprising:
configuring, based on the group-based beam report, communication with the UE on a joint channel that includes the two or more beams from the base station respectively paired with two or more beams from the UE; and
communicating with the UE on the joint channel based on transmitting, to the UE, information configuring the communication with the UE on the joint channel.

21. The method of claim 20, wherein the configuring, based on the group-based beam report, the communication with the UE on the joint channel comprises:
configuring transmission/reception using the two or more beams from the UE respectively paired with the two or more beams from the base station, and
wherein the transmission/reception using the two or more beams from the UE respectively paired with the two or more beams from the base station comprises at least one of simultaneous transmission/reception or non-simultaneous transmission/reception that is time-division multiplexed.

22. An apparatus for wireless communication by a user equipment (UE), comprising:
a memory; and
at least one processor coupled to the memory and configured to:
estimate, for two or more resources on two or more beams having phase continuity, an effective joint channel associated with the two or more beams based on individual measurements respectively corresponding to the two or more beams; and
transmit, to the base station, a group-based beam report including the joint channel information that indicates the effective joint channel.

23. The apparatus of claim 22, wherein the at least one processor is further configured to:
receive, from the base station, an indication that the two or more resources on the two or more beams from the base station have the phase continuity,
wherein the two or more resources on the two or more beams from the base station are determined to have the phase continuity based on the indication.

24. The apparatus of claim 23, wherein the indication comprises a channel state information (CSI) report configuration enabling group-based beam reporting, and wherein the CSI report configuration configures the two or more resources on the two or more beams having the phase continuity.

25. The apparatus of claim 22, wherein each of the two or more resources carries at least one of a channel state information (CSI) reference signal (RS) or a synchronization signal block (SSB).

26. The apparatus of claim 25, wherein the at least one processor is further configured to:
determine each of the individual measurements corresponding to a respective beam of the two or more beams based on at least one of the CSI-RS or the SSB carried on a respective resource of the two or more resources on the respective beam of the two or more beams.

27. An apparatus for wireless communication at a base station, comprising:
a memory; and
at least one processor coupled to the memory and configured to:
transmit, to a user equipment (UE), an indication that two or more resources on two or more beams from the base station have phase continuity; and
receive, from the UE, a group-based beam report including joint channel information that indicates an estimation of an effective joint channel associated with the two or more beams, wherein the estimation of the effective joint channel is based on individual measurements respectively corresponding to the two or more beams.

28. The apparatus of claim 27, wherein the joint channel information comprises at least one of information estimating an effective joint channel that is based on pair-wise estimation by the UE of individual components respectively associated with the two or more beams or mutual information that is based on individual measurements by the UE respectively corresponding to the two or more beams from the base station.

29. The apparatus of claim 27, wherein the indication comprises a channel state information (CSI) report configuration enabling group-based beam reporting by the UE, and wherein the CSI report configuration configures the two or more resources on the two or more beams having the phase continuity.

30. The apparatus of claim 27, wherein each of the two or more resources carries at least one of a channel state information (CSI) reference signal (RS) or a synchronization signal block (SSB).

* * * * *